(12) United States Patent
Chen et al.

(10) Patent No.: US 6,551,710 B1
(45) Date of Patent: Apr. 22, 2003

(54) COATING COMPOSITION

(75) Inventors: Fang Chen, Hallet Cove (AU); Huan Kiak Toh, Fullarton (AU); Mark Christopher Fisher, Woodcroft (AU); Matthew John Cuthbertson, Somerton Park (AU)

(73) Assignee: Sola International Holdings, Ltd., Lonsdale (AU)

( * ) Notice: Subject to any disclaimer, the term of this patent is extended or adjusted under 35 U.S.C. 154(b) by 0 days.

(21) Appl. No.: 09/600,002
(22) PCT Filed: Dec. 14, 1998
(86) PCT No.: PCT/AU98/01032
§ 371 (c)(1),
(2), (4) Date: Sep. 12, 2000
(87) PCT Pub. No.: WO99/38924
PCT Pub. Date: Aug. 5, 1999

(30) Foreign Application Priority Data

Jan. 29, 1998 (AU) .............................................. PP1559

(51) Int. Cl.[7] .............................. B32B 27/36; C08F 2/46
(52) U.S. Cl. ...................... 428/412; 428/500; 428/522; 428/523; 522/49; 522/51
(58) Field of Search .................. 428/515, 516, 428/520, 518, 500, 523, 522, 412; 522/49, 51

(56) References Cited

U.S. PATENT DOCUMENTS 4,415,651 A * 11/1983 Proskow .................. 430/277.1
5,061,605 A * 10/1991 Kawamura et al. ...... 430/281.1

FOREIGN PATENT DOCUMENTS

JP  09297201  * 11/1997
WO  WO 97/44272  * 11/1997

* cited by examiner

*Primary Examiner*—D. Lawrence Tarazano
(74) *Attorney, Agent, or Firm*—Burns, Doane, Swecker & Mathis, LLP

(57) ABSTRACT

An ultraviolet irradiation curable primer composition for coating optical articles, in which the primer composition comprises: a dithiol or polythiol compound, and an allyl or vinyl monomer. The coating composition can further comprise photochromic dyes and additional polymerizable monomers.

46 Claims, No Drawings

COATING COMPOSITION

The present invention relates to the manufacture of plastic optical articles such as video discs and ophthalmic lenses, and in particular coatings for such lenses.

The most widely used plastic ophthalmic lens material is polymerised diethylene glycol bis (allyl carbonate) (e.g. CR-39). This polymer has proved a satisfactory material for the manufacture of ophthalmic tenses because of a combination of features, including excellent transmission, resistance to discolouration, high strength and high impact resistance. The material has only a reasonable abrasion resistance.

Such lenses can be made to be hard and abrasion resistant by the use of abrasion resistant coatings; however, their impact resistance can be greatly reduced by these hard, abrasion resistant coatings, especially in combination with a brittle vacuum deposited anti-reflection coating. Thin lenses, with a center thickness of about 1.0 mm, are highly desired for cosmetic and weight considerations. However, the thickness of a lens is related to the impact properties of the lens. Specifically, thinner lenses have a lower impact resistance.

Coatings have been used in the prior art mainly to promote adhesion or provide a physical barrier as protection against chemicals, dirt, oxidation, etc. It is known in the prior art, in ophthalmic applications, to utilise coats (via back-surface coating) to enhance the fracture resistance of lenses which are coated with thin layers of glasslike anti-reflection (AR) coatings. However, the coatings commercially available in the prior art are based on (blocked) polyurethane chemistry, and the curing involves a lengthy period where the material is tacky, leading to contamination by airborne particles and yield loss.

Further whilst it is known in the prior art that dyes, including photochromic dyes, may be directly introduced into low index refractive lens materials and certain medium to high refractive index material directly by way of imbibition, this is not possible with polycarbonates such as CR-39 and other high index materials.

Accordingly, for such materials it is necessary to apply a coating material to a surface of the lens which material is capable of receiving a dye material. However, such a technique presents optical problems, e.g. in matching refractive indices and physical problems in that the coating, when applied, is in a tacky, gel-like state and may take 1 hour or more to cure to a dry state.

During this tacky step, the coating is susceptible to dust, other airborne contaminants and yield loss.

Lenses formed from polymers including divinyl benzene and discussed in the prior art are generally brittle and have a high yellowness index.

Japanese Patent Application 63-309509 to Showa Denko KK discloses the formation of a prepolymer of divinyl benzene and a polythiol compound which may be used in the formation of optical materials with high refractive indexes.

Japanese Patent Application 63-19498 to Mitsubishi Gas discloses a high refractive index composition of divinyl benzene and a thiol compound. However optical lenses produced thereby exhibit unacceptable strain characteristics and cure times.

However, there remains a need in the prior art for optical articles having high refractive indexes, having improved impact resistance, and preferably improved abrasion resistance. There further remains a need for optical articles of medium to high refractive index which permit introduction of dyes.

Accordingly, it is an object of the present invention to overcome, or at least alleviate, one or more of the difficulties related to the prior art.

Accordingly, in a first aspect the present invention provides a cross-linkable primer coating composition which is UV curable, exhibits a very short cure time, and includes an effective amount of a di-or polythiol compound.

Preferably, the cross-linkable primer coating composition further includes an effective amount of an allyl or vinyl monomer; and optionally a polymerisable comonomer.

The primer coating composition may be UV-curable. The primer coating composition may be UV-curable in air. This provides a highly pure product, substantially free of by-products, and improved process control. Further, the primer coating composition is receptive to the inclusion of dyes, including photochromic dyes. The dyes may be included directly in the composition or may be introduced into a coating formed from the composition, e.g. by imbibition.

It will be understood that this is a significant improvement over the prior art. With acrylic resins, the inclusion of a photochromic material would render a UV cure extremely difficult, if not impossible, as the dye is competing with the monomer acrylate. This is particularly so in an air environment where the air would normally further exhibit UV cure.

Whilst we do not wish to be restricted by theory, it is postulated that the high purity relates to the fact that there is no or substantially no homopolymerisation of the allylic or vinyl monomer under UV reaction conditions. This may be contrasted with prior art coatings in which acrylic monomers are a major component.

It will be further understood that as the coating composition according to the present invention may be subjected to a UV cure having a very short cure time, a hard, non-tacky coat is formed virtually immediately, so the possibility of contamination or yield loss may be substantially reduced or eliminated.

In a preferred aspect of the present invention there is provided a coated optical article including an optical article; and a primer coating on at least a surface of the optical article, the primer coating being formed from a primer coating composition which is UV curable, exhibits a very short cure time; and includes an effective amount of a di- or polythio compound.

Preferably, the primer coating composition further includes an effective amount of an allyl or vinyl monomer; and optionally a polymerisable comonomer.

An optical article coated with the primer coating composition of the present invention may be optically clear and substantially aberration free. The primer coating may provide improved impact resistance to the optical article and may provide improved adhesion for other coatings including abrasion resistant coatings.

The thickness of the primer coating may be varied to adjust adhesion and/or impact strength of the final product. Thickness may vary from approximately 0.01 $\mu$m to 100 $\mu$m, preferably approximately 0.1 $\mu$m to 50 $\mu$m.

As discussed below, the primer coating may, in one preferred embodiment, incorporate a dye material, e.g. a photochromic material. Where the primer coating includes a photochromic material, the thickness of the primer coating is preferably at the upper end of the above ranges. For medium to high refractive index optical articles such as CR39 lens, the primer coating thus functions to permit introduction of a dye either directly in the primer coating composition or indirectly, e.g. by imbibition into the primer coating so formed.

For example, preferably when the primer coating includes a dye component the coating has a thickness of approximately 10 to 75 micron In contrast, preferably when the primer coating does not include a dye component, the primer coating has a thickness of approximately 0.1 to 5 micron. In this form, the primer coating functions principally to provide an improvement in impact resistance and optionally improved adhesion.

The coating formed from the primer coating composition may exhibit a high refractive index and a low glass transition temperature (Tg), preferably below approximately 60° C. The refractive index may be tailored to that of the optical substrate. The refractive index may be varied for example between approximately 1.50 to approximately 1.65.

By the term "high refractive index", as used herein, we mean a polymer having a refractive index of at least approximately 1.55, preferably 1.57. By the term "very high refractive index" as used herein, we mean a polymer having a refractive index of approximately 1.59 or above, preferably 1.60 or above.

As stated above, the coated optical article may further include a dye component, preferably a photochromic dye component. The dye component may be introduced into the primer coating or included in the primer coating composition, as desired.

In a preferred aspect, the primer coating composition according to the present invention is surprisingly UV curable, preferably in air, in the presence of a photochromic dye component. Accordingly in this aspect, the present invention provides a cross-linkable primer coating composition which is UV curable in the presence of a photochromic dye component, exhibits a very short cure time and includes an effective amount of a di- or polythiol monomer;

an allyl or vinyl monomer;

a photochromic dye component; and optionally a polymerisable comonomer.

Preferably the photochromic dye is selected from one or more of the group consisting of anthraquinones, phthalocyanines, spiro-oxazines, chromenes, pyrans and fulgides.

More preferably the photochromic dye is selected from one or more of the group consisting of 1,3-dihydrospiro[2H-anthra[2,3-d]imidazole-2,1'-cyclohexane]-5,10-dione 1,3-dihydrospiro[2H-anthra[2,3-d]imidazole-2,1'-cyclohexane]-6,11-dione 1,3-dihydro-4-(phenylthio)spiro[2H-anthra'1,2-d]imidazole-2,1'-cyclohexane]-6,11-dione 1,3-dihydrospiro[2-H-anthra[1,2-d]imidazole-2,1'-cycloheptane]-6,11-dione 1,3,3-trimethylspiroindole-2,3'-[3H]naphtho[2,1-b]-1,4-oxazine]

1,3,3-trimethyl-9'-hydroxyspiroindolinenaphthoxadine 1,3,3-trimethyl-9'-(2-hydroxyethyloxy)-spiroindolinenaphthoxadine 1,3,3-trimethyl-6'-piperidino-9'-hydroxy-spiroindolinenaphthoxadine 2-methyl-3,3'-spirobi[3H-naphtho[2,1-b]pyran](2-Me)

2-phenyl-3-methyl-7-methoxy-8'-nitrospiro[4H-1-benzopyran-4,3'-[3H]-naphtho]2,1-b]pyran Spiro[2H-1-benzopyran-2,9'-xanthene]

8-methoxy-1',3'-dimethylspiro(2H-1-benzopyran-2,2'-(1'H)-quinoline 2,2'-Spirobi[2H-1-benzopyran]

5'-amino-1',3',3'-trimethylspiro[2H-1-benzopyran-2,2'-indoline

Ethyl-β-methyl-β-(3',3'-dimethyl-6-nitrospiro(2H-1-benzopyran-2,2'-indolin-1'-yl)-propenoate (1,3-propanediyl)bis[3',3'-dimethyl-6-nitrospiro[2H-1-benzopyran-2,2'-indoline]

3,3'-dimethyl-6-nitrospiro[2H-1-benzopyrao-2,2'-benzoxazoline]

6'-methylthio-3,3'-dimethyl-8-methoxy-6-nitrospiro[2H-1-benzopyran-2,2'-benzothiozoline]

(1,2-ethanediyl)bis[8-methoxy-3-methyl-6-nitrospiro[2H-1-benzopyran-2,2'-benzothiozoline]

N-N'-bis(3,3'-dimethyl-6-nitrospiro[2H-1-benzopyran-2,2'(3'H)-benzothioazol-6'-yl)decanediamide -α-(2,5-dimethyl-3-furyl)ethylidene(Z)-ethylidenesuccinic anhydride; α-(2,5-dimethyl-3-furyl)-α',δ-dimethylfulgide 2,5-diphenyl-4-(2'-chlorophenyl)imidazole

[(2',4'-dinitrophenyl)methyl]-1H-benzimidazole

N-N-diethyl-2-phenyl-2H-phenanthro[9,10-d]imidazol-2-amine

2-Nitro-3-aminofluoren 2-amino-4-(2'-furanyl)-6H-1,3-thiazine-6-thione

The di- or polythiol compound in the primer coating composition of the present invention may be of any suitable type. The thiols may have a functionality of 1 to 8, preferably 1 to 4. A di-, tri- or tetra polythiol compound may be used. The thiol may be selected from one or more of the following:

a) 4-mercaptomethyl-3,6-dithia-1,8-octanedithiol [MDO]

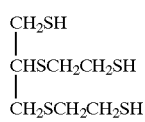

b) Trimethylolpropane Tris(3-mercaptopropionate) [TTMP]

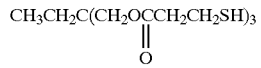

c) Pentaerythritol Tetrakis(3-mercaptoacetate)[PTMA]

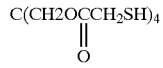

d) Trimethylolpropane Tris(3-mercaptoacetate)[TTMA]

e) 4-t-butyl-1,2-benzenedithiol

[Structure: benzene ring with C(CH₃)₃ group and two adjacent SH groups]

f) Bis-(2-mercaptoethyl)sulfide $HSCH_2CH_2SCH_2CH_2SH$ g) 4,4'-thiodibenzenethiol

[Structure: HS-phenyl-S-phenyl-SH]

h) benzenedithiol

[Structure: benzene ring with two SH groups]

i) Glycol Dimercaptoacetate $H_2COOCH_2—SH$
$|$
$H_2COOCH_2—SH$ j) Glycol Dimercaptopropionate Ethylene bis(3-Mercaptopropionate)

$H_2COOCCH_2—CH_2—SH$
$|$
$H_2COOCCH_2—CH_2—SH$ k) Polyethylene Glycol Dimercaptoacetates $\left[\begin{array}{c}CH_2-\!\!\!\!-CH_2OOCCH_2—SH\\|\\O\\|\\CH_2-\!\!\!\!-CH_2OOCCH_2—SH\end{array}\right]_n$ l) Polyethylene Glycol Di(3-Mercaptopropionates)

$\left[\begin{array}{c}CH_2-\!\!\!\!-CH_2OOCCH_2—CH_2—SH\\|\\O\\|\\CH_2-\!\!\!\!-CH_2OOCCH_2—CH_2—SH\end{array}\right]_n$ m) Pentaerythritol Tetrakis(3-mercapto-propionate) [PTMP]

$C(CH_2OCCH_2CH_2SH)_4$
        $\|$
        $O$ n) Mercapto-methyl tetrahydrothiophene[MMTHT]

[Structure: tetrahydrothiophene ring with two CH₂SH groups]

o) Tris-(3-mercaptopropyl)isocyanurate[TMPIC]

[Structure: isocyanurate ring with three -(CH₂)₃-SH groups]

p) 2-mercaptoethyl sulphide $HSCH_2CH_2OCH_2CH_2SH$ q) 1,2,3-trimercaptopropane $\begin{array}{ccc}SH & SH & SH\\|&|&/\\CH_2&CH&CH_2\end{array}$ r) 2,2-bis(mercaptomethyl)-1,3-propanedithiol $C(CH_2SH)_4$ s) Dipentaerythrithiol $O[CH_2C(CH_2SH)_3]_2$ t) 1,2,4-trimercaptomethyl benzene

[Structure: benzene ring with three CH₂SH groups at 1,2,4 positions]

u) 2,5-dimercaptomethyl-1,4-dithiane

[Structure: 1,4-dithiane ring with two CH₂SH groups at 2,5 positions]

v) Bisphenolfluorene bis(ethoxy-3-mercaptopropionate) (BPHE-SH)

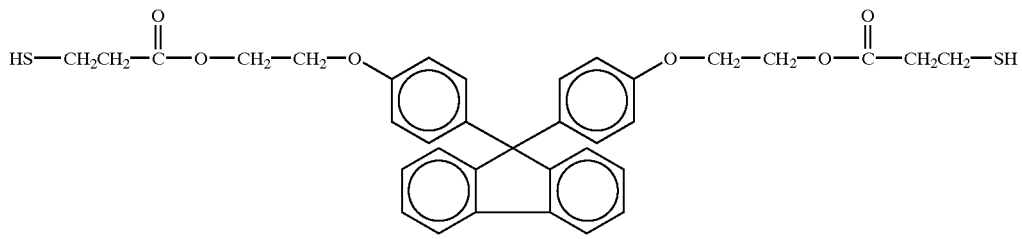

w) 4,8-bis(mercaptomethyl)-3,6,9-trithia-1,11-undecanedithiol

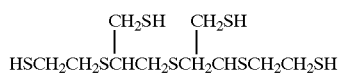

x) 2-mercaptomethyl-2-methyl-1,3-propanedithiol

y) DMDO: 1,8-dimercapto-3,6-dioxaoctane

z) Thioglycerol bismercapto-acetate (TGBMA)

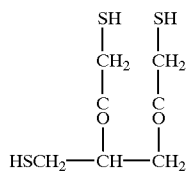

4-mercaptomethyl-3,6-dithia-1,8-octanedithiol [MDO], Trimethylolpropane Tris (3-mercaptopropionate) [TTMP] and pentaerythritol tetrakis (3-mercapto-propionate) [PTMP] and pentaerythritol tetrakis(3-merceptoacetate) are particularly preferred.

The di- or polythiol compound may preferably be present in amounts of from approximately 15 to 80% by weight, more preferably approximately 20 to 70% by weight and particularly approximately 30 to 60% by weight based on the total weight of the primer coating composition (excluding solvent if any). Variations in the amount of di- or poly-thiol compound may permit the user to select a refractive index value within a specified range. For example the refractive index may be varied between 1.50 and 1.65 or above.

The allyl or vinyl monomer may be a di- or polyallyl or di- or polyvinyl monomer, or mixtures thereof. A diallyl compound or triallyl is preferred.

The allyl monomer may accordingly preferably be selected from one or more of the following:

a) Diallyl isophthalate

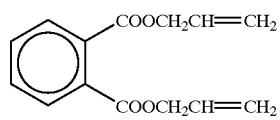

b) Tetraallyl pyromellitate

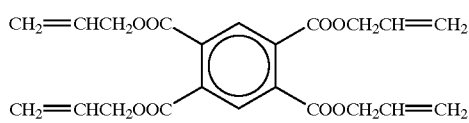

c) Triallyl trimesate

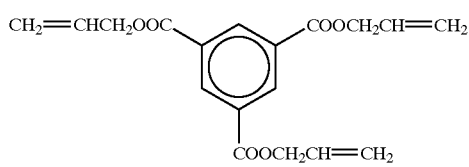

d) Triallyl isocyanurate (TAIC)

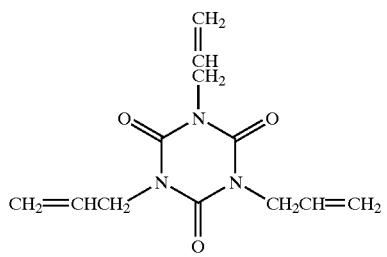

e) Triallyl cyanurate (TAC)

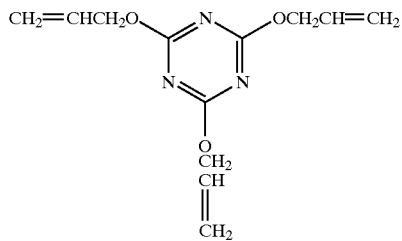

f) Tetraallyloxyethane

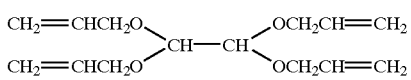

g) Triallylamine

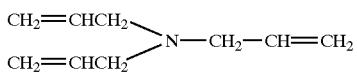

A diethylene glycol bis(allyl) carbonate, such as that sold under the trade designation CR-39 has been found to be suitable. A triallyl compound, such as triallyl cyanurate or triallyl isocyanurate, has also been found suitable. The vinyl or polyvinyl monomer, when present, may be a di- or trivinyl monomer.

An aromatic divinyl may be included. The aromatic divinyl monomer may include divinyl benzene, divinyl naphthene or derivatives thereof. 1,5-divinyl naphthene may be used. Divinyl benzene is particularly preferred.

Vinyl ethers are also preferred components in the coating composition. Divinyl ether and trivinyl ether monomers and oligomers are particularly preferred. The vinyl ether monomers and oligomers may accordingly preferably be selected from one or more of the following:

1) 1-Butanol, 4-ethenyloxy)-benzoate

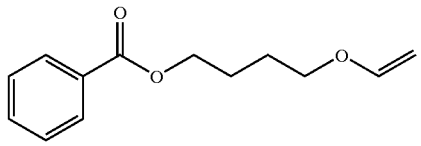

2) Cyclohexanemethanol, 4-[(ethenyloxy)methyl]-, benzoate

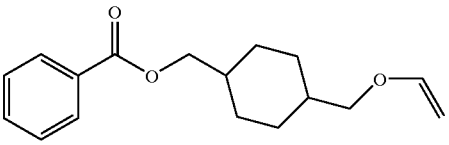

3) 1,3-Benzenedicarboxylic acid, bis [4-(ethenyloxy) butyl]ester

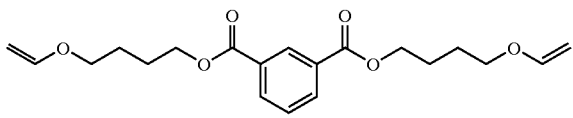

4) Pentanedioic acid, bis[[4-[(ethenyloxy)methyl] cyclohexyl]methyl]ester

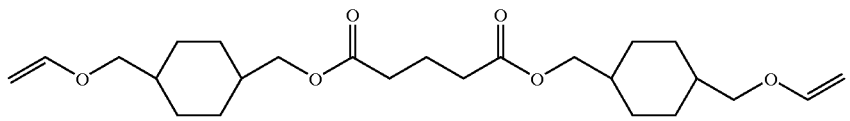

5) Butanedioic acid, bis[4-ethenyloxy)butyl]ester

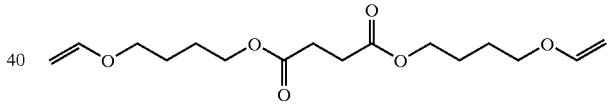

6) Hexanedioic acid, bis[4-(thenyloxy)butyl]ester

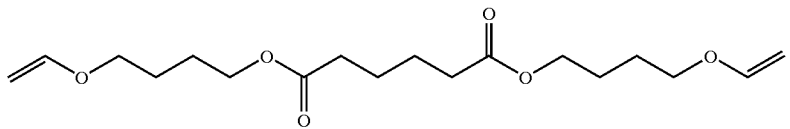

7) Carbamic acid, (methylenedi-4,1-phenylene)bis-, bis [4-(ethenyloxy)butyl]ester

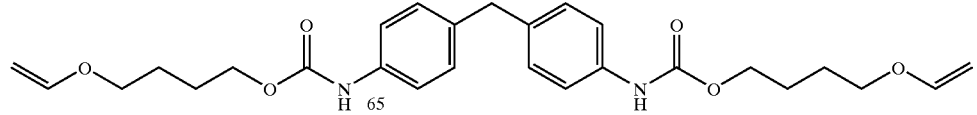

8) Carbamic acid, (4-methyl-1,3-phenylene)bis-, bis[4-(ethenyloxy)butyl]ester

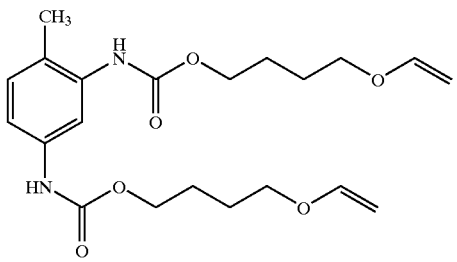

9) 1,2,4-Benzenetricarboxylic acid, tris[4-ethenyloxy)butyl]ester

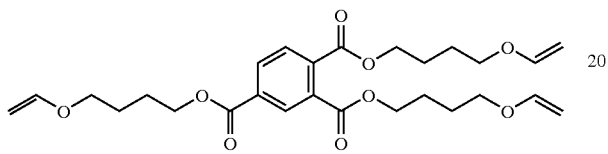

10) Vectomer 1214 Polyester
11) Vectomer 1221 Aromatic polyester divinyl ether
12) Vectomer 1222 Aromatic polyester divinyl ether
13) Vectomer 1312 Polyfunctional ester
14) Polyfunctional polyester
15) Vectomer 2010 Aromatic urethane divinyl ether
16) Vectomer 2020 Aliphatic urethane divinyl ether
17) Vectomer 2031 Aromatic urethane divinyl ether
18) Vectomer 2032 Aromatic urethane divinyl ether A polyurethane divinyl ether is particularly preferred. A divinyl ether oligomer, such as that sold under the trade designation Vectomer 2020 from Allied Signal has been found suitable.

The allyl or vinyl monomer may preferably be present in amounts sufficient to provide a suitable index to the optical coating formed from the primer coating composition, but not so much as to cause brittleness or low solvent resistance ability. Amounts of from approximately 10 to 80% by weight, preferably approximately 15 to 75% by weight, more preferably about 20 to 60% by weight based on the total weight of the primer coating composition may be used (excluding solvents if any).

The primer coating composition in a preferred aspect may optionally further include a polymerisable comonomer.

The polymerisable comonomer may be selected to improve the properties and/or processability of the primer coating composition. The polymerisable comonomer may be selected to improve tint rate, hardness, abrasion resistance, adhesion, solvent resistance and the like of the resulting polymer coating. The polymerisable comonomer may be an unsaturated epoxy, mercapto or isocyanate comonomer. The polymerisable comonomer may be selected from any suitable type, e.g. methacrylates, acrylates, vinyls, vinyl ethers, allyls, epoxides, and the like.

The polymerisable comonomer may preferably be selected from one or more of epoxidised monomer or oligomer vinyls, allylics, polyoxyalkylene glycol di-, tri-, tetra- and higher acrylates or methacrylates, polymerisable bisphenol monomers, urethane monomers having 2 to 6 terminal acrylic or methacrylic groups, fluorene acrylates or methacrylates, and thioacrylate or thiomethacrylate monomers, and high rigidity, high Abbe number acrylic or methacrylic monomers.

Where an epoxidised monomer or oligomer is included, the epoxidised monomer may function to improve curing characteristics and/or adhesion to both lens and hard coats. The epoxidised monomer or oligomer may fall into one or more of the following classes: internal, terminal, mono-functional, di-functional, tri-functional, tetra-functional, aliphatic, aromatic, cyclic, structurally simple, structurally complex, esters, ethers, amines. An epoxidised soybean material may be used. The epoxidised monomer or oligomer may be selected from one or more of the following 1) Epoxidised soybean oil—Triglycerides of a mixture of epoxidised a) oleic acid, b) linoleic acid, c) linolinic acid a) 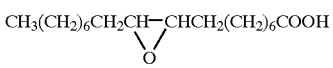

b) 

c) 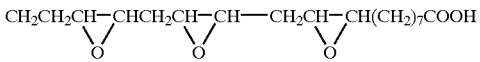

2) Propylene Oxide

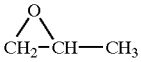

3) Hexanediol diglycidyl ether (HDGE)

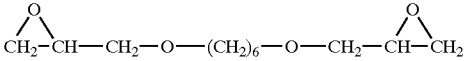

4) 1,2 epoxy butane

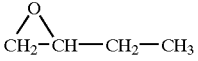

5) Alkyl (C12~13) (glycidyl ether)

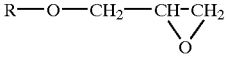

6) Ethylene glycol (diglycidyl ether)

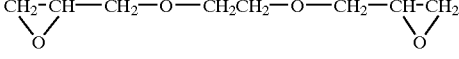

7) PEG#200 (diglycidyl ether)

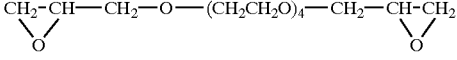

8) PEG#400 (diglycidyl ether)

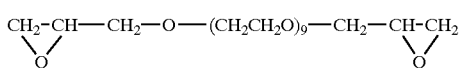

9) Propylene glycol (diglycidyl ether)

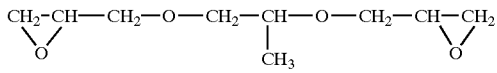

10) Tripropylene glycol (diglycidyl ether)

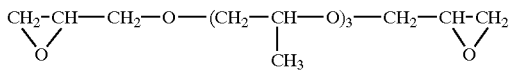

11) PPG#400 (diglycidyl ether)

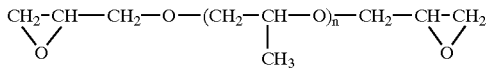

12) Neopentyl glycol (diglycidyl ether)

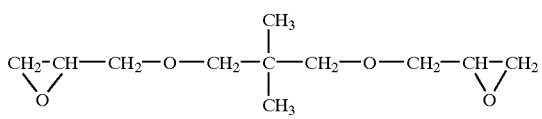

13) 1-6-hexanediol (diglycidyl ether)

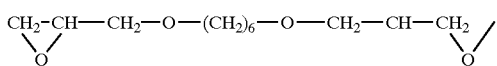

14) Grycerin (diglycidyl ether)

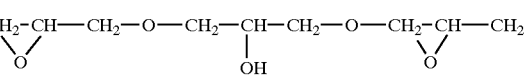

15) Trimethylolpropane (triglycidyl ether)

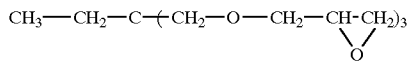

16) Hydrogenize bisphenol A (diglycidyl ether)

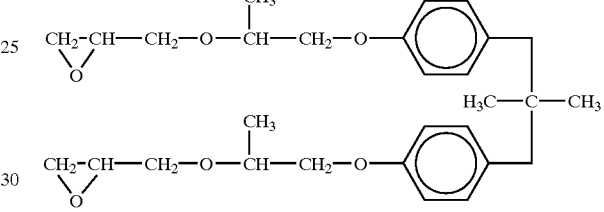

17) Diglycidyl ether of propylene oxide modified (bisphenol A)

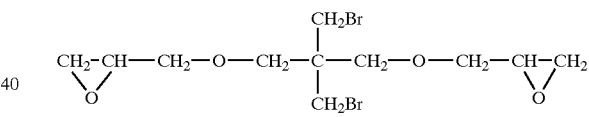

18) Dibromo neopentyl glycol (diglycidyl ether)

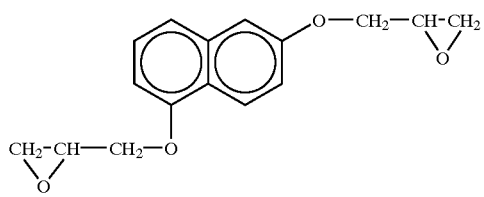

19) Epicion HP-4032

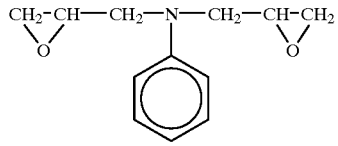

20) N,N-Diglycidyl aniline 21) 3,4-Epoxy-6-methycyclohexyl-methy-3,4-epoxy-6-methylcyclohexane carboxylate
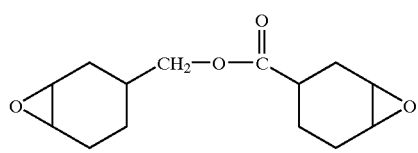
22) EPPN-201
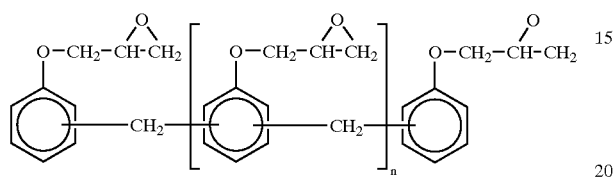
23) Oxiranemethanamine; N-(2-methylphenyl)-N-(oxiranylmethyl)-N,N-Diglycidyl-o-toluidine
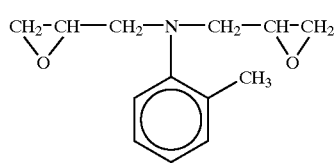
24) AK-601
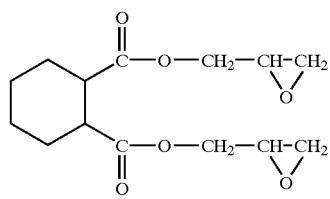
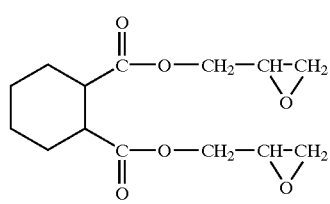
25) DER 331;DER 332
26) MY721 TGDDM
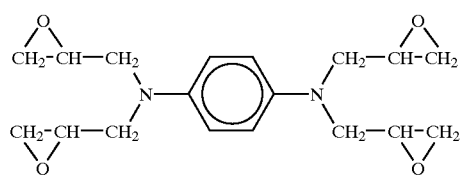
27) Epolight 100MF
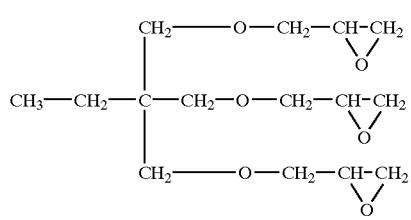
28) AGE (Allyl Glycidyl Ether)
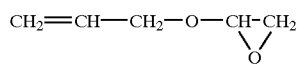
29) GE-510 (Glycidyl Methacrylate)
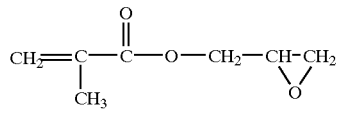
30) BPGE (Bisphenol Fluorene Diglycidyl Ether)
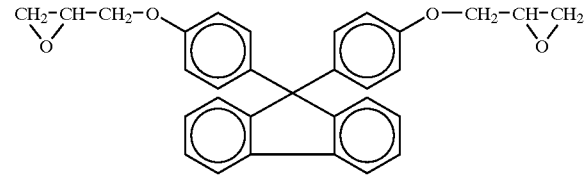
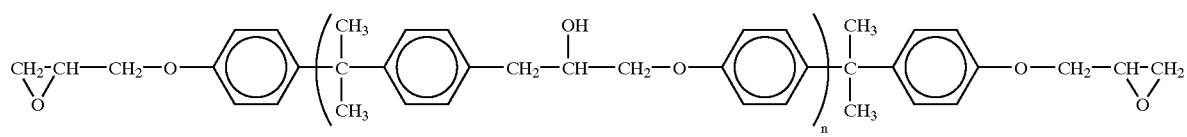

31) Glycidyl Ether of 4-Hydroxyphenyl sulfone

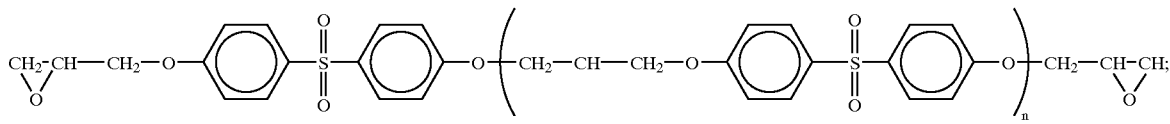

32) Diglycidyl Ether of Bisphenol F

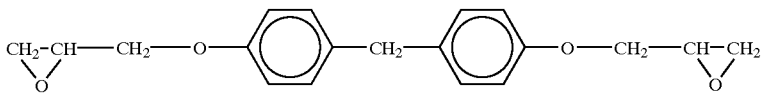

The epoxidised monomer may be present in amounts of from approximately 0.001% to 20% by weight, preferably 0.01% to 5%, based on the total weight of the primer coating composition (excluding solvent if any).

Where a vinyl comonomer is included, the vinyl comonomer may be selected from styrene, substituted styrenes, 3,9-divinyl-2,4,8,10-tetraoxaspiro[5.5]undecane (DTU), a divinyl ester monomer of a bi- or polycyclic compound and mixtures thereof. The divinyl ester monomer of a bi- or polycyclic compound may be of the type described in copending provisional patent application entitled "UV Curable High Index Vinyl Esters" to Applicants, the entire disclosure of which is incorporated herein by reference.

The vinyl comonomers may be present in amounts of from 0 to approximately 20% by weight, preferably approximately 5 to 15% by weight, based on the total weight of the casting composition.

Where a thiodiacrylate or dimethacrylate is included, the thiodiacrylate or dimethacrylates may be selected from bis(4-methacryloylthioethyl)sulfide (BMTES) and bis(4-methacryloylthiophenyl)sulfide (BMTS). The thioacrylate or methacrylate may be present in amounts of from 0 to approximately 20% by weight, preferably approximately 5 to 15% by weight, based on the total weight of the casting composition.

Where a fluorene diacrylate or dimethacrylate is included, the fluorene diacrylate or dimethacrylate monomer may be selected from a bisphenol fluorene dihydroxy acrylate (BFHA) or a bisphenol fluorene dimethacrylate (BFMA) or mixtures thereof.

The fluorene diacrylate or dimethacrylate monomer may be present in amounts of from 0 to approximately 20% by weight, preferably approximately 1 to 10% by weight.

The polyoxy alkylene glycol diacrylate or dimethacrylate compound according to the present invention, when present, may include ethylene oxide or propylene oxide repeating units in its backbone. A polyethylene glycol dimethacrylate is preferred. Suitable materials include dimethylacrylates where the number of repeating ethylene oxide groups is between 4 and 14. Suitable materials include those sold under the trade names NK Ester 4G, 6G, 9G or 16G. A 9G monomer is preferred.

The polyoxy alkylene glycol diacrylate or dimethacrylate component may be present in amounts of from 0 to approximately 20% by weight, preferably approximately 5% to 15% by weight, based on the total weight of the casting composition.

The high index bisphenol monomer component in the cross-linkable casting composition when present may be selected from: dimethacrylate and diacrylate esters of bisphenol A; dimethacrylate and diacrylate esters of 4,4'bishydroxy-ethoxy-bisphenol A and the like.

Preferred high index bisphenol compounds include bisphenol A ethoxylated dimethacrylate and tetra brominated bisphenol A ethoxylated dimethacrylates. A bisphenol A ethoxylate dimethacrylate sold under the trade designation ATM 20 by Ancomer has been found to be suitable.

The high index bisphenol monomer may be present in amounts of from 0 to approximately 20% by weight, preferably 5 to 15% by weight based on the total weight of the casting composition.

The high rigidity, low colour dispersion (High Abbe number) acrylic or methacrylic monomer, when present, may be selected from acrylates or methacrylate derivatives of a cycloolefin. An acrylate or methacrylate derivative of tricyclodecane is preferred.

The acrylate or methacrylate derivative may be of the formula:

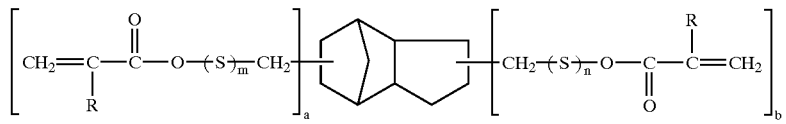

where R can be H or $CH_3$ $a=1-3$, $b=1-3$, $m=-0-6$, $n=0-6$.

S is a spacer group selected from one or more of the following $-(CH_2)_p-O-$

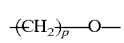

or

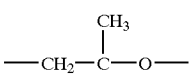 or derivatives thereof;

wherein p=1–4

A tricyclodecane dimethanol diacrylate or methacrylate is preferred.

A tricyclodecane dimethanol diacrylate or diacryloyl oxymethyl tricyclodecane of the following formula is preferred.

(DCPA)

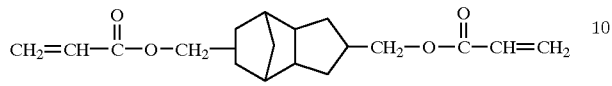

The highly rigid acrylic or methacrylic monomer, when present, may alternatively be selected from highly rigid, high Abbe No. polyfunctional acrylates or methacrylates. Pentaerythritol tetracrylate (PTA) is a preferred example.

The highly rigid acrylic or methacrylic monomer may be present in amounts sufficient to provide high Abbe number and high rigidity, but not so much as to cause brittleness. Amounts of from approximately 0 to 20% by weight, preferably approximately 2.5 to 15% by weight, more preferably approximately 2.5 to 10% by weight, based on the total weight of the primer coating composition have been found to be suitable.

Where an epoxide comonomer is not included, or its adhesion promoting effect is not sufficient, the primer coating composition, in a preferred aspect, may further include an adhesion promoting/modifying comonomer.

The adhesion comonomer may be selected from any one or more of the group consisting of isocyanates, mercaptans, anhydrides, epoxides, silanes, carboxylic acid, amines, ketones and alcohols.

The adhesion promoting comonomer may be selected from any one or more of the following:

Triethoxysilane
Methyltrimethoxysilane
Methyltriethoxysilane
methyltri-n-propoxysilane
Ethyltrimethoxysilane
Ethyltriethoxysilane
n-Propyltrimethoxysilane
n-Propyltriethoxysilane
n-Propyltri-n-propoxysilane
n-Propyltri-n-butoxysilane
n-Buthyltrimethoxysilane
Vinyltrimethoxysilane
Vinyltriethoxysilane
N-β-aminoethyl-γ-aminopropyltrimethoxysilane
γ-Aminopropyltrimethoxysilane
γ-Aminopropyltriethoxysilane
Chloromethyltrimethoxysilane
γ-Chloropropyltrimethoxysilane
Cyclohexyltrimethoxysilane
β-Cyanoethyltriethoxysilane
β-(3,4-Epoxycyclohexyl)ethyltrimethyloxysilane
γ-Glycidoxypropyltrimethoxysilane
3-Mercaptopropyltrimethoxysilane
3-Methacryloxypropyltrimethoxysilane
Phenyltrimethoxysilane
Phenyltriethoxysilane
N-(Trimethoxysilylpropyl)imidazole
3-Aminopropyltrisilanolate
Vinyltrisilanolate
Phthalic anhydride
Methyl-4-endomethylene-tetrahydrophthalic anhydride
Hexahydrophthalic anhydride
Tetrahydrophthalic anhydride
Dodecenylsuccinic anhydride
Succinic anhydride
Methacrylic anhydride
1,6-Hexamethylene diisocyanate
Isiphorone diisocyanate
4,4'-Dicyclohexylmethane diisocyanate
1,4-Cyclohexane diisocyante
Bis(isocyanatomethyl)cyclohexane
Tetramethylxylylene diisocyanate
Methyl isocyanate
n-butyl isocyanate
Phenyl isocyanate
3-Chlorophenyl isocyanate
3,4-Dichlorophenyl isocyanate
p-Toluenesulfonyl isocyanate
Toluene 2,4-diisocyanate
Toluene 2,6-diisocyanate
4,4'-Methylene diphenyl diisocyanate
2,4'-methylene diphenyl diisocyanate
Polymeric methylene diphenyl diisocyanate
P-phenylene diisocyanate
Naphthalene-1,5-diisocyanate The adhesion promoting comonomer may be present in amounts of from approximately 0.001% to 20% by weight, preferably approximately 0.01% to 10% by weight, based on the total weight of the primer coating composition (excluding solvent if any).

The primer coating composition may further include one or more solvents. The solvent may be selected from one or more of water, alcohols such as 1-butanol ethanol, and ketones such as methylethyl ketone and methyl isobutyl ketone. However, an advantage of the present invention is that the thiol-based primer coating composition may desirably be prepared without the use of solvents, or with minimal use of solvents, thus greatly simplifying the process and reducing throughput time. This is particularly so where a thin primer coating is to be prepared. Where a solvent is included, the solvent may be present in amounts of from 0 to approximately 95% by weight, based on the total weight of the primer coating composition.

The primer coating composition according to the present invention may also contain from 0 to 10% by weight of a colloidal dispersion of a water insoluble dispersant of metals, non-metals, alloys, or salts thereof, such as colloidal silica or antimony oxide. The silica may be in the form of a silicon dioxide ($SiO_2$) dispersed in a solvent.

The primer coating composition according to the present invention may include a polymerisation curing agent.

The polymerisation curing agent may be selected from one or more of a UV curable (photo) initiator, radical heat cationic or radical initiator. A UV curable photo initiator is preferred. The compositions may be cured by a combination of UV radiation and heat.

The amount of curing agent may vary with the monomers selected. It has been possible to operate with a relatively low level of curing agent of between approximately 0.05 and 4%, preferably 0.05% to 3.0% by weight.

The following curing agents have been found to be suitable.

Azodiisobutyronitrile
  AIBN (Azo radical heat initiator)
2,2'-Azobis(N,N'-dimethyleneisobutyramidine) dihydrochloride

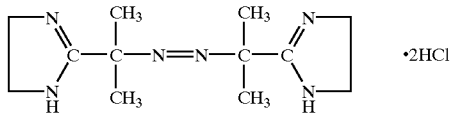

2,2'-Azobis(2-amidinopropane)dihydrochloride

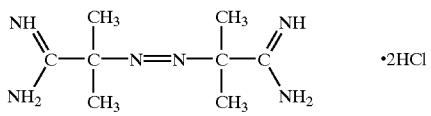

2,2'-Azobis(N,N'-dimethyleneisobutyramidine)

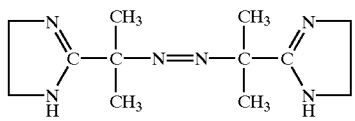

4,4'-Azobis(4-cyanopentanoic acid)

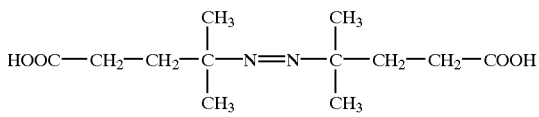

2,2'-Azobis{2-methyl-N-[1,1-bis(hydroxymethyl)-2-hydroxyethyl]propionamide}

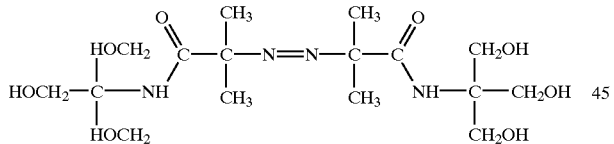

2,2'-Azobis{2-methyl-N-[1,1-bis(hydroxymethyl)ethyl]propionamide}

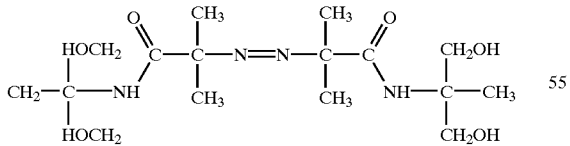

2,2'-Azobis[2-methyl-N-(2-hydroxyethyl)propionamide]

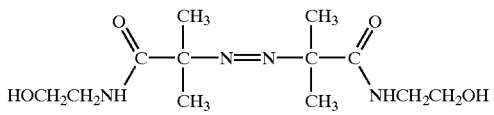

2,2'-Azobis(isobutyramide)dihydrate

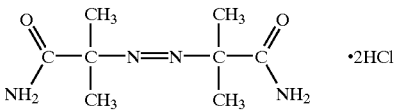

2,2'-Azobis(4-methoxy-2,4-dimethylvaleronitrile)

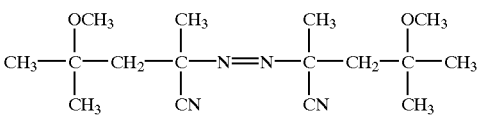

2,2'-Azobis(2,4-dimethylvaleronitrile)

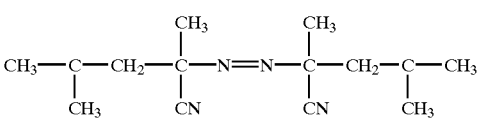

2,2'-Azobisisobutyronitrile

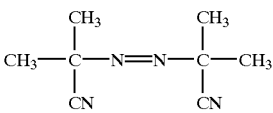

Dimethyl 2,2'-azobis-isobutyrate

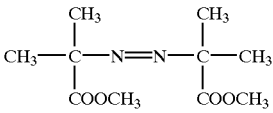

2,2'-Azobis(2-methyl-butyronitrile)

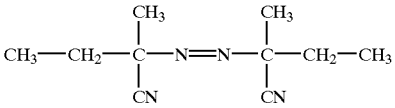

1,1'-Azobis(1-cyclohexanecarbonitrile)

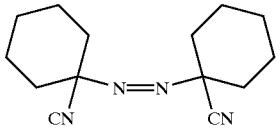

2-(Carbamoylazo)-isobutyronitrile

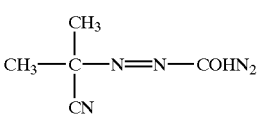

2,2'-Azobis(2,4,4-trimethylpentane)

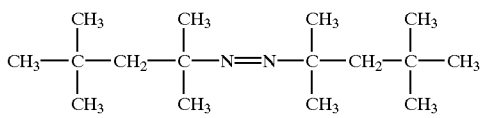

2-Phenylazo-2,4-dimethyl-4-methoxyvaleronitrile

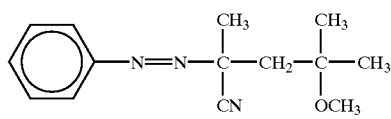

2,2'-Azobis(2-methylpropane)

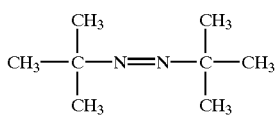

Trigonox TX-29 (Dialkyl Peroxide radical heat initiator)
1,1-di-(-butyl peroxy-3,3,5-trimethyl cyclohexane)
TBPEH (Alkyl Perester radical heat initiator)
t-butyl per-2-ethylhexanoate
(Diacyl Peroxide radical heat initiator)
Benzoyl Peroxide
(Peroxy Dicarbonate radical heat initiator)
Ethyl Hexyl Percarbonate
(Ketone Peroxide radical heat initiator)
Methyl ethyl ketone peroxide
Cyracure UV1-6974 (cationic photoinitiator)
Triaryl sulfonium hexafluoroantimonate
Lucirin TPO (radical photoinitiator)
2,4,6-Trimethylbenzoyidiphenylphosphine oxide Irgacure 819
Bis(2,4,6-trimethylbenzoyl)-phenyl-phosphine oxide
1-Bis(2,6-dimethoxybenzoyl)-2,4,4-trimethylpentyl phosphineoxide
Vicure 55 (radical photoinitiator)
methyl phenylglycoxylate
Bis(t-butyl peroxide)diisopropylbenzene
t-butyl perbenzoate
t-butyl peroxy neodecanoate
Amicure DBU
Amicure BDMA
DABCO
polycat SA-1
polycat SA-102
polycat SA-610/50
Aluminium acetyl acetonate
dibutyltin dilaurate
dibutyltin oxide
Darocur 1173
Irgacure 184
Irgacure 500
Irgacure 1800
Irgacure 1850
The initiator may be a single component or combination of initiator components.

Other additives may be present which are conventionally used in coating compositions such as inhibitors, surfactants, UV absorbers, stabilisers and materials capable of modifying refractive index. Such additives may include:
Leveling Agents Including
  3M FC 430
  3M FC 431
Surfactants Including
  Fluorinated surfactants or polydimethyl siloxane surfactants such as
  FC430, FC431 made by 3M, BYK300, BYK371 made by Mallinckrodt, SF-1066, SF-1141 and SF-1188 made by General Electric Company, L-540, L-538 sold by Union Carbide and DC-190 sold by Dow Corning.
UV Absorbers Including
  Ciba Geigy Tinuvin P-2(2'-hydroxy-5'methyl phenyl) benzotriazole
  Cyanamid Cyasorb UV 531-2-hydroxy-4-n-octoxybenzophenone
  Cyanamid Cyasorb UV5411-2(2-hydroxy-5-t-octylphenyl)-benzotriazole
  Cyanamid UV 2098-2 hydroxy-4-(2-acryloyloxyethoxy) benzophenone
  National Starch and Chemicals Permasorb MA-2 hydroxy-4-(2 hydroxy-3-methacryloxy)propoxy benzophenone
  Cyanamid UV24-2,2'-dihydroxy-4-methoxybenzophenone
  BASF UVINUL 400-2,4 dihydroxy-benzophenone
  BASF UVINUL D-49-2,2'-dihydroxy-4,4' dimethoxy-benzophenone
  BASF UVINUL D-50-2,2', 4,4' tetrahydroxy benzophenone
  BASF UVINUL D-35-ethyl-2-cyano-3,3-diphenyl acrylate
  BASF UVINUL N-539-2-ethylhexyl-2-cyano-3,3-diphenyl acrylate
  Ciba Geigy Tinuvin 213
Stabilisers Including
  Hydroquinone
Coating Solution Stabilizers
  Nitroso compounds such as Q1301 and Q1300 from Wako
Hindered Amine Light Stabilisers (HALS), Including
  Ciba Geigy Tinuvin 765/292-bis(1,2,2,6,6-pentamethyl-4-piperidyl)sebacate
  Ciba Geigy 770-bis(2,2,6,6-tetramethyl-4-piperidinyl) sebacate
Antioxidants Including
  Ciba Geigy Irganox 245-triethylene glycol-bis-3-(3-tertbutyl-4-hydroxy-5-methyl phenyl)propionate
  Irganox 1010-2,2-bis[[3-[3,4-bis(1,1-dimethylethyl)-4-hydroxyphenyl[-1-oxopropoxy]methyl]-1,3-propanediyl 3,5-bis(1,1-dimethyl ethyl)-4-hydroxy benzene propanoate
  Irganox 1076-octadecyl 3-(3',5'-di-tert-butyl(-4'-hydroxyphenyl)propionate
  hydroquinone
  BHT
  TBC
  MEHQ (4-methoxyphenone)
  2-ethoxy-5-(propenyl)phenol
  Isoeugenol 2-allyl phenol
butylated hydroxyanisole Anticolouring Agents Including
  10 dihydro-9-oxa-10-phosphaphenanthrene-1-oxide Cure Modifiers Including
  Dodecyl mercaptan
  Butyl mercaptan
  Thiophenol
  Nitroso compounds such as Q1301 from Wako
  Nofmer from Nippon Oils and Fats Other monomeric additives can be present in amounts up to 10% by weight as viscosity modifiers, and include monomers such as methacrylic acid, vinyl silanes, and other functional monomers. Other monomeric additives may be included to improve processing and/or material properties, these include:
  methacrylic acid, maleic anhydride, acrylic acid
  dye-enhancing, pH-adjusting monomers like Alcolac SIPOMER 2MIM
  a charge-reducing cationic monomer to render the material more antistatic, example Sipomer Q5–80 or Q9–75

The primer coating composition according to the present invention may be utilised in the preparation of a coated optical article, as discussed above.

In a preferred aspect the primer coating exhibits improved impact resistance and/or improved adhesion to the optical article and to a secondary coating, when present.

In an alternative preferred aspect, there is provided a coated optical article including
  an optical article; and
  an optically clear primer coating on at least one surface of the optical article, the primer coating being receptive to the inclusion of dyes; the primer coating being formed by UV curing a cross-linkable primer coating composition including an effective amount of a di- or polythiol compound.

Preferably the primer coating composition further includes
  an allyl or vinyl monomer; and optionally
  a polymerisable comonomer.

The composition of primer coating may be tailored so that its refractive index substantially matches that of the optical article. The primer coating may have a thickness in the range of approximately 0.01 to 100 micron ($\mu$m). Preferably when the primer coating includes a dye component the coating has a thickness of approximately 10 to 75 micron.

When the primer coating includes a dye component the primer coating is applied to at least the front (convex) surface of the optical article.

Alternatively, when the primer coating functions to provide improved impact resistance to the optical article, the primer coating preferably has a thickness of approximately 0.7 to 5 micron.

The optical article may be a camera lens, optical lens element, video disc or the like. An optical lens element is preferred.

By the term "optical lens element" we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material.

Where the optical article is an optical lens, the optical lenses may be formed from a variety of different lens materials, and particularly from a number of different polymeric plastic resins. Medium to high index lens materials, e.g. those based on acrylic or allylic versions of bisphenols or allyl phthalates and the like are particularly preferred. Other examples of lens materials that may be suitable for use with the invention include other acrylics, other allylics, styrenics, polycarbonates, vinylics, polyesters and the like. The lens material "Spectralite" of Applicants or like mid to high index lens materials are particularly preferred. A Finalite-type material of applicants may also be used.

The utilisation of a primer coating with a Spectralite-type optical lens is particularly advantageous in improving adhesion to a secondary coating, as well as improving the impact resistance of the lens. This is particularly so where an anti-reflective (AR) coating is also included. Such AR coatings may otherwise cause a plastic optical lens to exhibit increased brittleness, for example when heat is applied.

A common ophthalmic lens material is diethylene glycol bis (allyl carbonate). One such material is a CR39 (PPG Industries).

The optical article may be formed from cross-linkable polymeric casting compositions, for example as described in the Applicants U.S. Pat. No. 4,912,155, U.S. patent application Ser. No. 07/781,392, Australian Patent Applications 50581/93 and 50582/93, and European Patent Specification 453159A2, the entire disclosures of which are incorporated herein by reference.

For example, in Australian Patent Application 81216/87, the entire disclosure of which is incorporated herein by reference, the Applicant describes a cross-linkable casting composition including at least polyoxyalkylene glycol diacrylate or dimethacrylate and at least one poly functional unsaturated cross-linking agent.

Further, in Australian patent Application 75160/91, the entire disclosure of which is incorporated herein by reference, the Applicants describe a polyoxyalkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

Where the optical article is an ophthalmic lens, the primer coating may be applied to the front and/or back surface of the lens. Preferably, for impact improvement the primer coating is applied to the back (concave) surface only of the lens. For photochromic applications the primer layer is applied preferably to the front (convex) surface only of the lens.

The coated optical article may further include one or more additional coatings. Accordingly in a further aspect of the present invention there is provided a multi-coated optical article including
  an optical article; and
  a primer coating on at least one surface of the optical article, the optical clear primer coating formed from a primer coating composition including an effective amount of
    a di- or polythio compound;
    an allyl or vinyl monomer; and optionally
    a polymerisable comonomer; and
  a secondary coating which provides a desirable optical and/or mechanical property to the optical article, which coating at least in part overlays the primer coating.

The optical article may be an optical lens element, as described above.

In a preferred aspect, one or both surfaces of the optical article may be subjected to a surface treatment to improve bondability and/or compatibility of the primer and/or secondary coating. The surface treatment may be selected from one or more of the group consisting of chemical treatment such as a caustic treatment and/or utilisation of an adhesion promoter for example (as described above), or physical treatment such as plasma discharge, corona discharge, glow discharge, ionising radiation, UV radiation, flame treatment and laser, preferably excimer laser, treatment. A UV radiation, corona discharge and/or caustic treatment is preferred.

The secondary coating may be of any suitable type. The secondary coating may be one or more of a tint coating, including a photochromic coating, polarising coating, an anti-reflective, abrasion resistance or impact resistant coating.

Accordingly in a preferred aspect there is provided a multi-coated optical article including an optical article;
a primer coating on at least one surface of the optical article, the primer coating formed from a primer coating composition including an effective amount of
a di- or polythio compound;
an allyl or vinyl monomer; and optionally
a polymerisable comonomer; and
a secondary anti-reflective and/or abrasion resistance coating, which coating at least in part overlays the primer coating; wherein the primer coating provides improved impact resistance to the optical article.

Preferably the optical article is an optical lens, more preferably a polycarbonate or Spectralite-type lens. As stated above, an anti-reflective coating may cause a plastic optical lens, e.g. a Spectralite-type lens, to exhibit increased brittleness. The inclusion of a primer coating provides an improvement in impact resistance to at least in part compensate for the brittle coating.

An abrasion-resistant (hard) coating may also be included. The combination of an abrasion resistant coating and an anti-reflective coating is particularly preferred. The anti-reflective (AR) coating may overlay the abrasion resistant coating. An abrasion-resistant coating including an organosilicone resin is preferred. A typical organosilicone resin that is suitable for use in the present invention has a composition comprising one or more of the following:

1) organosilane compounds with functional and/or non-functional groups such as glycidoxypropyl trimethoxy silane;
2) co-reactants for functional groups of functional organosilanes, such as organic epoxies, amines, organic acids, organic anhydrides, imines, amides, ketamines, acrylics, and isocyanates; colloidal silica, sols and/or metal and non-metal oxide sols; catalysts for silanol condensation, such as dibutyltin dilaurate;
3) solvents such as water, alcohols, and ketones;
4) other additives, such as fillers;

Abrasion resistant coats of acrylic, urethane, melamine, and the like may also be used. These materials, however, frequently do not have the good abrasion resistant properties of organo-silicone hard coatings.

The abrasion-resistant (hard) coating may be coated by conventional methods such as dip coating, spray coating, spin coating, flow coating and the like. Coating thicknesses of between approximately 0.5 and 10 microns are preferred for abrasion and other properties.

The secondary coating may alternatively, or in addition, include a single or multi-layer anti-reflective coating. Multi-layer anti-reflective coatings are preferred from an optical performance viewpoint. Examples of materials useful in forming anti-reflective coatings include oxides, fluorides, suicides, borides, carbides, nitrides and sulfides of metal and non-metals and metals.

More specifically, metal oxides which are useful for forming anti-reflective coatings include $SiO$, $SiO_2$, $ZrO_2$, $Al_2O_3$, $TiO$, $TiO_2$, $Ti_2O_3$, $Y_2O_3$, $Yb_2O_3$, $MgO$, $Ta_2O_5$, $CeO_2$ and $HfO_2$. Fluorides which may be used include $MgF_2$, $AlF_3$, $BaF_2$, $CaF_2$, $Na_3AlF_6$, $Ta_2O_5$, and $Na_5Al_3Fl_{14}$. Metals which may be used include Cr, W and Ta. These substances may also be used in the form of mixtures.

The above mentioned substances may be formed into a single layer or multi-layer anti-reflective coatings by vacuum evaporation, deposition, sputtering, ion plating, and ion beam assisted methods.

The coated optical article may include a photochromic material or coating. The photochromic material may be incorporated into the optical article in any suitable manner, e.g. utilising an imbibing technique or by incorporation into the primer coating composition as discussed below.

The primer and/or secondary coating, when present, may alternatively or in addition include a photochromic material or coating. The photochromic material may include a photochromic dye.

The photochromic dye may be of any suitable type. A photochromic dye may be selected from one or more of the group consisting of anthraquinones, phthalocyanines, spiro-oxazines, chromenes, pyrans including spiro-pyrans and fulgides. A spiro-oxazine residue is preferred. The photochromic dye may be selected from any of those described above.

The selection of dyes which may be used may extend to conventional tinting dyes.

The photochromic material may be introduced to the coated optical article in any suitable manner. The photochromic dye may be incorporated into a polymer carrier or may be directly imbibed into the optical article, the primer, or other secondary coating or any combination thereof.

In a preferred aspect a photochromic monomer may be incorporated into the composition of the polymeric casting composition, the primer or secondary coating composition or any combination. The photochromic monomer may, for example, be of the type described in International Patent Application PCT/AU96/00466 to applicants, the entire disclosure of which is incorporated herein by reference.

The primer coating composition of the present invention may be applied to the front and/or back surface of the optical article by conventional methods, such as spin coating, flowing, spraying or dipping, to form a continuous coating. A thin coating is preferred. Preferred coating thicknesses which are about 0.1 micron to about 50 microns thick may be obtained by spin coating procedures.

In a preferred aspect of the present invention there is provided a method for preparing a coated optical article which method includes providing
a mould;
a primer coating composition including an effective amount of
a di- or polythio compound;
an allyl or vinyl monomer; and optionally
a polymerisable comonomer; and
a cross-linkable polymeric casting composition;
applying a layer of the primer coating composition to at least a first face of a mould used to manufacture the optical article, wherein the first face is capable of imparting a desired optical configuration on the first optical surface of the optical article;

reacting the primer coating composition to a degree that it forms a dry film that is at least weakly adhered to the first face and substantially exactly replicates the first face in an aberration-free manner;

filling the mould with a cross-linkable polymeric casting composition capable of hardening to a solid, room temperature-stable state; and hardening the casting composition so as to form the optical article and adhere the dry primer coating to the first optical surface.

Coatings applied by the process of the present invention may be thin (typically having a thickness of from about 0.1 to 100$\mu$, and preferably of from about 0.1 to 50$\mu$. Furthermore, the coatings are free from surface aberrations due to non-uniformity of the thickness of the coating solution, flow marks, coating build-up, particularly at the segment lines and edges of the optical article. Additionally, they exactly replicate the mould surface from which the ophthalmic device is made and consequently provide an optical surface having the desired surface configuration.

In a preferred aspect, the hardening step includes
introducing
a UV cured agent and optionally
a heat curing agent; and
subjecting the casting composition and coating composition to a UV curing step.

The curing agent may be present in an amount of from approximately 0.05% to 4% by weight.

The casting composition may be formed into a suitable article by mixing in a convenient vessel the components making up the material, and then adding the curing catalyst. The mixed material may then be degassed or filtered. As the curing time is substantially reduced, the casting process may be undertaken on a continuous or semi-continuous basis.

Where a dye component is to be introduce, a dye, e.g. a photochromic dye, may be included in the primer coating composition.

Alternatively, the method may further include subjecting the coated optical article to an imbibition step to introduce a dye into the primer coating layer.

In a further aspect of the present invention there is provided a coated optical article prepared by the method as described above.

The present invention will now be more fully described with reference to the accompanying examples. It should be understood, however, that the description following is illustrative only and should not be taken in any way as a restriction on the generality of the invention described above.

EXAMPLE 1

Thiolene Primer Coating

Thiols are mixed with polyfunctional allyl or vinyl compounds (functionalities from 1 to 8, preferably from 2 to 4) with photoinitiators and suitable solvents. This mix is coated onto the concave side of the lenses by spin coating method and polymerised by UV light. Adhesion improving agent can be used to improve the adhesion of the primer with the lenses. After hard coating and AR coating this primer coating can improve the impact resistance of the lenses comparing with the lenses without primer coating.

EXAMPLE 2

| Composition | Parts |
|---|---|
| TAIC | 15.5 |
| PTMP | 13.0 |
| 3-mercaptopropyl-trimethoxy silane | 15.0 |
| methyl isobutyl ketone | 26.0 |
| 1-butanol | 13.0 |
| darocur 1173 | 1.5 |
| surfactant (FC430) | 0.5 |
| water (pH = 1) | 2.0 |
| methanol | 13.0 |

This primer coating was spin coated on the concave side of the lenses of CR-39, Spectralite and special high index material. After UV cure (fusion, D lamp), the lenses were coated on both sides with conventional hard coating and AR coating. The impact test showed that the lenses with above primer coating are more impact resistant than the ones without.

This primer coating has a refractive index of 1.54, it suits lenses with refractive index from 1.52 to 1.56.

EXAMPLE 3

| Composition | Parts |
|---|---|
| TAIC | 14.5 |
| MDO | 10 |
| 3-mercaptopropyl-trimethoxy silane | 11.5 |
| methyl isobutyl ketone | 36 |
| 1-butanol | 12.5 |
| darocur 1173 | 0.5 |
| surfactant (FC430) | 0.05 |
| water (pH = 1) | 1.5 |
| methanol | 12 |

This primer coating was spin coated on the concave side of the lenses of CR-39, Spectralite and a special high index material. After UV cure (fusion, D lamp), the lenses were coated on both sides with traditional hard coating and AR coating. The impact test showed that the lenses with above primer coating are more impact resistant than the ones without.

This primer coating has a refractive index of 1.60, it suits lenses with refractive index from 1.58 to 1.62.

EXAMPLE 4

| Composition | Parts |
|---|---|
| TAIC | 19 |
| PTMP | 20 |
| 3-mercaptopropyl-trimethoxy silane | 14 |
| methyl isobutyl ketone | 36 |
| 1-butanol | 9.5 |
| darocur 1173 | 1 |
| surfactant (FC430) | 0.5 |
| hydroquinone | 0.2 |

This primer coating was spin coated on the concave side of the lenses of CR-39, Spectralite and a special high index material. After UV cure (fusion, D lamp), the lenses were coated on both sides with traditional hard coating. The impact test showed that the lenses with above primer coating are more impact resistant than the ones without.

This primer coating has a refractive index of 1.54, it suits lenses with refractive index from 1.52 to 1.56.

EXAMPLE 5

| Composition | Parts |
| --- | --- |
| TAIC | 26 |
| MDO | 22 |
| methyl isobutyl ketone | 29.5 |
| 1-butanol | 10.5 |
| darocur 1173 | 1.0 |
| surfactant (FC430) | 0.05 |
| 3-mercaptopropyl-trimethoxy silane | 10 |
| hydroquinone | 0.5 |

This primer coating was spin coated on the concave side of the lenses of CR-39, Spectralite and a special high index material. After UV cure (fusion, D lamp), the lenses were coated on both sides with traditional hard coating and AR coating. The adhesion of the coating to the lens is good. The impact test showed that the lenses with above primer are more impact resistant than the ones without.

This primer coating has a refractive index of 1.60, it suits lenses with refractive index from 1.58 to 1.62.

EXAMPLE 6

| Composition | Parts |
| --- | --- |
| TAIC | 23 |
| PTMP | 14.5 |
| GDMP | 14.5 |
| MPTMS | 7 |
| hydroquinone | 0.5 |
| Darocur 1173 | 0.5 |
| methyl isobutyl ketone | 31.5 |
| 1-butanol | 8 |
| FC 430 | 0.05 |

GDMP = glycol dimercapto propionate
MPTMS = mercapto propyl trimethyloxy silane

Example 5 was repeated utilising the above composition. The primer coating so formed has a refractive index of 1.54 it suits lenses with refractive index from 1.52 to 1.56.

EXAMPLE 7

| Composition | Parts |
| --- | --- |
| Vectomer 2020 | 6.06 |
| TAIC | 8.62 |
| TTMP | 12.26 |
| 3-mercaptopropyl-trimethoxy silane | 2.59 |
| methyl isobutyl ketone | 51.40 |
| 1-butanol | 18.50 |
| darocur 1173 | 0.23 |
| surfactant (FC430) | 0.11 |

This formulation is for improving the impact resistance of lenses. Before coating, the Spectralite lens' concave side were treated with corona discharge. Then the above primer coating was spin coated on the concave side of the lenses. After UV cure (fusion, D lamp, belt speed 70 mm/s, twice) a 2 micron thick primer coating was obtained. The lenses were then coated on both sides with hard coating and AR coating. The impact test showed that the lenses with above primer are much more impact resistant than the ones without.

This primer has a refractive index 1.53, it suit lenses with refractive index from 1.51 to 1.55.

EXAMPLE 8

| Composition | Parts |
| --- | --- |
| Vectomer 2020 | 3.33 |
| TAIC | 9.69 |
| TTMP | 13.59 |
| 3-mercaptopropyl-trimethoxy silane | 2.87 |
| methyl isobutyl ketone | 51.40 |
| hydroquinone | 0.26 |
| 1-butanol | 18.50 |
| darocur 1173 | 0.26 |
| surfactant (FC430) | 0.11 |

This formulation is for improving the impact resistance of lenses. Before coating, the Spectralite lens' concave side were treated with corona discharge. Then the above primer coating was spin coated on the concave side of the lenses. After UV cure (fusion, D lamp, belt speed 70 mm/s, twice) a 2 micron thick primer coating was obtained. The lenses were then coated on both sides with hard coating and AR coating. The impact test showed that the lenses with above primer are much more impact resistant than the ones without.

This primer has a refractive index 1.53, it suit lenses with refractive index from 1.51 to 1.55.

EXAMPLE 9

| Composition | Parts |
| --- | --- |
| Vectomer 2020 | 10.25 |
| TAIC | 7.10 |
| TTMP | 11.24 |
| 3-mercaptopropyl-trimethoxy silane | 1.12 |
| methyl isobutyl ketone | 51.40 |
| hydroquinone | 0.20 |
| 1-butanol | 18.50 |
| darocur 1173 | 0.10 |
| surfactant (FC430) | 0.11 |

This formulation is for improving the impact resistance of lenses. Before coating, the Spectralite lens' concave side were treated with corona discharge. Then the above primer coating was spin coated on the concave side of the lenses. After UV cure (fusion, D lamp, belt speed 70 mm/s, twice) a 2 micron thick primer coating was obtained. The lenses were then coated on both sides with hard coating and AR coating. The impact test showed that the lenses with above primer are much more impact resistant than the ones without.

This primer has a refractive index 1.53, it suit lenses with refractive index from 1.51 to 1.55.

EXAMPLE 10

| Composition | A | B | C | D |
|---|---|---|---|---|
| TAIC | 10.92 | 11.32 | 11.05 | 11.38 |
| TTMP | 15.28 | 12.68 | 12.37 | 11.47 |
| MDO |  | 2.07 |  | 2.08 |
| TMPIC |  |  | 2.72 | 1.12 |
| MPTMS | 3.23 | 3.35 | 3.27 | 3.36 |
| methyl isobutyl ketone | 51.40 | 51.40 | 51.40 | 51.40 |
| hydroquinone | 0.29 | 0.29 | 0.29 | 0.29 |
| 1-butanol | 18.50 | 18.50 | 18.50 | 18.50 |
| darocur 1173 | 0.29 | 0.29 | 0.29 | 0.29 |
| surfactant (FC430) | 0.11 | 0.11 | 0.11 | 0.11 |
| Refractive index | 1.55 | 1.55 | 1.55 | 1.55 |

These formulations are for improving the impact resistance of lenses. Before coating, the Spectralite lens' concave sides were treated with corona discharge. Then the above primer coating was spin coated on the concave side of the lenses. After UV cure (fusion, D lamp, belt speed 70 mm/s, twice) a 2 micron thick primer coating was obtained. The lenses were then coated on both sides with hard coating and AR coating. The impact test showed that the lenses with above primer are much more impact resistant than the ones without.

These primers have a refractive index 1.53, it suit lenses with refractive index from 1.51 to 1.57.

EXAMPLE 11

| Composition | Parts |
|---|---|
| TAIC | 12.95 |
| MDO | 11.14 |
| 3-mercaptopropyl-trimethoxy silane | 5.04 |
| methyl isobutyl ketone | 51.40 |
| hydroquinone | 0.29 |
| 1-butanol | 18.50 |
| darocur 1173 | 0.59 |
| surfactant (FC430) | 0.11 |

This formulation is for improving the impact resistance of lenses. Before coating, the Finalite lens' concave side were treated with corona discharge. Then the above primer coating was spin coated on the concave side of the lenses. After UV cure (fusion, D lamp, belt speed 70 mm/s, twice) a 2 micron thick primer coating was obtained. The lenses were then coated on both sides with hard coating and AR coating. The impact test showed that the lenses with above primer are much more impact resistant than the ones without.

This primer has a refractive index 1.60, it suit lenses with refractive index from 1.58 to 1.62.

EXAMPLE 12

| Composition | Parts |
|---|---|
| CR-39 | 15.16 |
| TMPIC | 11.00 |
| 3-mercaptopropyl-trimethoxy silane | 3.25 |
| methyl isobutyl ketone | 51.40 |
| hydroquinone | 0.29 |
| 1-butanol | 18.50 |
| darocur 1173 | 0.29 |
| surfactant (FC430) | 0.11 |

This formulation is for improving the impact resistance of lenses. Before coating, the CR-39 lens' concave side were treated with corona discharge. Then the above primer coating was spin coated on the concave side of the lenses. After UV cure (fusion, D lamp, belt speed 70 mm/s, twice) a 2 micron thick primer coating was obtained. The lenses were then coated on both sides with hard coating and AR coating. The impact test showed that the lenses with above primer are much more impact resistant than the ones without.

This primer has a refractive index 1.52, it suit lenses with refractive index from 1.50 to 1.54.

EXAMPLE 13

| Composition | A | B | C |
|---|---|---|---|
| Vectomer 2020 | 5.98 | 5.96 | 5.91 |
| TAIC | 8.52 | 8.52 | 8.52 |
| TTMP | 14.00 | 14.00 | 14.00 |
| Epolight 100MF | 1.00 | 1.00 | 1.00 |
| methyl isobutyl ketone | 51.40 | 51.40 | 51.40 |
| hydroquinone | 0.23 | 0.23 | 0.23 |
| 1-butanol | 18.50 | 18.50 | 18.50 |
| Q 1301 | 0.01 | 0.01 | 0.01 |
| polycat SA-1 | 0.1 | 0.1 | 0.1 |
| Darocur 1173 | 0.23 | 0.23 | 0.23 |
| surfactant (FC430) | 0.03 | 0.05 | 0.10 |

These formulations are for improving the impact resistance of lenses. Before coating, the Spectralite lens' concave sides treated with corona discharge. Then the above primer coating was spin coated on the concave side of the lenses. After UV cure (fusion, D lamp, belt speed 70 mm/s, twice), a 2 micron thick primer coating was obtained. The lenses were then coated on both sides with hard coating and AR coating. The impact test showed that the lenses with the above primer are much more impact resistant than the ones without.

These primer has a refractive index 1.53, it suits with refractive index from 0.51 to 1.55.

EXAMPLE 14

| Composition | A | B | C | D |
|---|---|---|---|---|
| Vectomer 2020 | 5.48 | 4.88 | 6.00 | 8.15 |
| TAIC | 7.79 | 6.94 | 7.79 | 7.05 |
| TTMP | 15.31 | 16.75 | 14.79 | 13.38 |
| Epolight 100MF | 0.9 | 0.9 | 0.9 | 0.9 |
| methyl isobutyl ketone | 51.45 | 51.45 | 51.45 | 51.45 |
| hydroquinone | 0.21 | 0.21 | 0.21 | 0.21 |
| 1-butanol | 18.52 | 18.52 | 18.52 | 18.52 |
| Q 1301 | 0.01 | 0.01 | 0.01 | 0.01 |
| polycat SA-1 | 0.09 | 0.09 | 0.09 | 0.09 |
| Darocur 1173 | 0.21 | 0.21 | 0.21 | 0.21 |
| surfactant (SF1188) | 0.03 | 0.03 | 0.03 | 0.03 |

These formulations are for improving the impact resistance of lenses. Before coating, the Spectralite lens' concave sides were treated with corona discharge. Then the above primer coating was spin coated on the concave side of the lenses. After UV cure (fusion, D lamp, belt speed 70 mm/s, twice), a 2 micron thick primer coating was obtained. The lenses were then coated on both sides with hard coating and AR coating. The impact test showed that the lenses with above primer are much more impact resistant than the ones without.

These primer has a refractive index 1.53, it suit lenses with refractive index from 1.51 to 1.55.

EXAMPLE 15

| Composition | A | B | C | D |
|---|---|---|---|---|
| Vectomer 2020 | 5.48 | 4.88 | 6.00 | 8.15 |
| TAIC | 7.79 | 6.94 | 7.79 | 7.05 |
| TTMP | 15.31 | 16.75 | 14.79 | 13.38 |
| Epolight 100MF | 0.9 | 0.9 | 0.9 | 0.9 |
| methyl isobutyl ketone | 51.45 | 51.45 | 51.45 | 51.45 |
| hydroquinone | 0.21 | 0.21 | 0.21 | 0.21 |
| 1-butanol | 18.52 | 18.52 | 18.52 | 18.52 |
| Q 1301 | 0.01 | 0.01 | 0.01 | 0.01 |
| Aluminium acetyl acetate | 0.09 | 0.09 | 0.09 | 0.09 |
| Darocur 1173 | 0.21 | 0.21 | 0.21 | 0.21 |
| surfactant (SF1188) | 0.03 | 0.03 | 0.03 | 0.03 |

These formulations are for improving the impact resistance of lenses. Before coating, the Spectralite lens' concave sides were treated with corona discharge. Then the above primer coating was spin coated on the concave side of the lenses. After UV cure (fusion, D lamp, belt speed 70 mm/s, twice), a 2 micron thick primer coating was obtained. The lenses were then coated on both sides with hard coating and AR coating. The impact test showed that the lenses with above primer are much more impact resistant than the ones without.

These primer has a refractive index 1.53, it suit lenses with refractive index from 1.51 to 1.55.

EXAMPLE 16

| Composition | A | B | C | D |
|---|---|---|---|---|
| Vectomer 2020 | 5.57 | 4.97 | 6.09 | 8.24 |
| TAIC | 7.79 | 6.94 | 7.79 | 7.05 |
| TTMP | 15.31 | 16.75 | 14.79 | 13.38 |
| Epolight 100MF | 0.9 | 0.9 | 0.9 | 0.9 |
| methyl isobutyl ketone | 51.45 | 51.45 | 51.45 | 51.45 |
| hydroquinone | 0.21 | 0.21 | 0.21 | 0.21 |
| 1-butanol | 18.52 | 18.52 | 18.52 | 18.52 |
| Q 1301 | 0.01 | 0.01 | 0.01 | 0.01 |
| Darocur 1173 | 0.21 | 0.21 | 0.21 | 0.21 |
| surfactant (SF1188) | 0.03 | 0.03 | 0.03 | 0.03 |

These formulations are for improving the impact resistance of lenses. Before coating, the Spectralite lens' concave sides were treated with corona discharge. Then the above primer coating was spin coated on the concave side of the lenses. After UV cure (fusion, D lamp, belt speed 70 mm/s, twice) a 2 micron thick primer coating was obtained. The lenses were then coated on both sides with hard coating and AR coating. The impact test showed that the lenses with the above primer are much more impact resistant than the ones without.

These primer has a refractive index 1.53, it suit lenses with refractive index from 1.51 to 1.55.

EXAMPLE 17

| | A | B | C | D | E | F |
|---|---|---|---|---|---|---|
| TAIC | 38.12 | 37.74 | 35.04 | 37.37 | 37.01 | 36.66 |
| PTMP | 56.93 | 45.10 | 52.34 | 33.49 | 22.11 | 10.95 |
| TTMP | 0 | 12.25 | 0 | 24.28 | 36.07 | 47.62 |
| Epolight 100MF | 2.93 | 2.90 | 10.76 | 2.87 | 2.84 | 2.81 |
| Hydroquinone | 0.96 | 0.95 | 0.88 | 0.94 | 0.93 | 0.92 |
| Lucirin TPO | 0.66 | 0.65 | 0.60 | 0.64 | 0.64 | 0.63 |
| Triallyl amine | 0.33 | 0.32 | 0.30 | 0.32 | 0.32 | 0.32 |
| FC430 | 0.08 | 0.08 | 0.08 | 0.08 | 0.08 | 0.08 |

These formulations are for photochromic lenses. Before coating, the lenses convex sides were treated with corona discharge. Then the above primer coating was spin coated on the front side of the lens with appropriate spin speed and time. After UV cure (fusion, D lamp, belt speed 20 mm/s, twice) 15 to 30 micron thick primer coating were obtained. After imbibition process, this primer layer become a photochromic layer. The lenses were then coated on both sides with hard coating and AR coating. Such obtained lenses are photochromic lenses.

EXAMPLE 18

| | A | B | C | D | E | F |
|---|---|---|---|---|---|---|
| TAIC | 36.36 | 36.00 | 33.40 | 35.64 | 35.30 | 34.96 |
| PTMP | 54.30 | 43.02 | 49.90 | 31.94 | 21.09 | 10.44 |
| TTMP | 0 | 11.68 | 0 | 23.16 | 34.40 | 45.42 |
| Epolight 100MF | 2.79 | 2.77 | 10.26 | 2.74 | 2.71 | 2.68 |
| Hydroquinone | 0.92 | 0.92 | 0.84 | 0.90 | 0.89 | 0.88 |
| Photochromic dyes | 3.81 | 3.81 | 3.81 | 3.81 | 3.81 | 3.81 |
| AIBN | 0.48 | 0.48 | 0.48 | 0.48 | 0.48 | 0.48 |
| Irgacure 819 | 0.95 | 0.95 | 0.95 | 0.95 | 0.95 | 0.95 |
| Triallyl amine | 0.31 | 0.31 | 0.31 | 0.31 | 0.31 | 0.31 |
| FC430 | 0.08 | 0.08 | 0.08 | 0.08 | 0.08 | 0.08 |

These formulations are for photochromic lenses. If necessary a minimum amount of solvent, for example, methyl isobutyl ketone can be used to dissolve the solid components before mix the above formulations. Before coating, the lenses convex sides were treated with corona discharge. Then the above primer coating was spin coated on the front side of the lenses with appropriate spin speed and time. After UV cured (fusion, V lamp, belt speed 20 mm/s, 4 times), 15 to 30 micron thick primer coating were obtained. The lenses were then coated on both sides with hard coating and AR coating. Such obtained lenses are photochromic lenses.

Finally, it is to be understood that various other modifications and/or alterations may be made without departing from the spirit of the present invention as outlined herein.

What is claimed is:

1. A coated optical article comprising:
    an optical article; and
    a primer coating on at least a surface of the optical article, the primer coating being formed from a cross-linkable primer coating composition which is UV curable and that comprises:
        a di- or polythiol compound;
        approximately 10 to 80% by weight of an allyl or vinyl monomer; and 0 to approximately 20% by weight of a polymerizable comonomer.

2. A coated optical article according to claim 1, wherein the primer coating composition is UV curable in air.

3. A coated optical article according to claim 2, wherein the primer coating composition comprises:
approximately 15 to 80% by weight, based on the total weight of the primer coating composition, excluding solvent, of a di- or polythiol compound having a functionality of from 2 to 4;
approximately 10 to 80% by weight or a di- or poly allyl or vinyl monomer; and
0 to approximately 20% by weight of a polymerizable comonomer that is selected from the group consisting of epoxidized monomer or oligomer; vinyls; allylics; polyoxyalkylene glycol; di-, tri-, tetra- and higher acrylates or methacrylates; polymerizable bisphenol monomers; urethane monomers having 2 to 6 terminal acrylic or methacrylic groups; fluorene acrylates or methacrylates; thioacrylate or thiomethacrylate monomers; acrylic or methacrylic monomers; and mixtures thereof.

4. A coated optical article according to claim 3, wherein the polythiol compound is selected from the group consisting of 4-mercaptomethyl-3,6-dithia-1,8-octanedithiol, trimethylolpropane tris(3-mercaptopropionate), pentaerythritol tetrakis (3-mercaptoacetate), trimethylolpropane tris(3-mercaptoacetate), 4-t-butyl-1,2-benzenedithiol, bis-(2-mercaptoethyl)sulfide, 4,4'-thiodibenzenethiol, benzenedithiol, glycol dimercaptoacetate, glycol dimercaptopropionate ethylene bis(3-mercaptopropionate), polyethylene glycol dimercaptoacetates, polyethylene glycol di(3-mercaptopropionates), pentaerythritol tetrakis(3-mercaptopropionate), mercapto-methyl tetrahydrothiophene, tris-(3-mercaptopropyl)isocyanurate, 2-mercaptoethyl sulphide, 1,2,3-trimercaptopropane, 2,2-bis(mercaptomethyl)-1,3-propanedithiol, dipentaerythrithiol, 1,2,4-trimercaptomethyl benzene, 2,5-dimercaptomethyl-1,4-dithiane, bisphenofluorene bis(ethoxy-3-mercaptoproprionate), 4,8-bis(mercaptomethyl)-3,6,9-trithia-1,11-undecanedithiol, 2-mercaptomethyl-2-methyl-1,3-propanedithiol, 1,8-dimercapto-3,6-dioxaoctane, thioglycerol bismercaptoacetate, and mixtures thereof.

5. A coated optical article according to claim 4, wherein the polythiol compound is selected from one or more of the group consisting of 4-mercaptomethyl-3,6-dithia-1,8-octanedithiol, trimethylolpropane tris(3-mercaptopropionate), pentaerythritol tetrakis(3-mercaptopropionate), and pentaerythritol tetrakis(3-merceptoacetate).

6. A coated optical article according to claim 3, wherein the allyl or vinyl monomer in the primer coating composition is selected from the group consisting of diallyl isophthalate, tetraallyl pyromellitate, triallyl trimesate, triallyl isocyanurate, triallyl cyanurate, tetraallyloxyethane, triallylamine, diethylene glycol bis(allyl) carbonate, and mixture thereof.

7. A coated optical article according to claim 6, wherein the allyl compound is a diethylene glycol bis(allyl) carbonate, a triallyl isocyanurate, or a triallyl cyanurate.

8. A coated optical article according to claim 3, wherein the allyl or vinyl monomer in the primer coating composition is an aromatic divinyl, divinyl ether or trivinyl ether monomer or oligomer that is selected from the group consisting of divinyl benzene, divinyl naphthene, 1-butanol, 4-(ethenyloxy)-benzoate, cyclohexanemethanol, 4-[(ethenyloxy)methyl]-benzoate, 1,3-benzenedicarboxylic acid, bis [4-(ethenyloxy)butyl]ester, pentanedioic acid, is[[4-[(ethenyloxy)methyl]cyclohexyl]methyl]ester, butanedioic acid, bis [4-ethenyloxy)butyl]ester, hexanedioic acid, bis[4-(thenyloxy)butyl]ester, carbamic acid, methylenedi-4,1-phenylene)bis-, bis[4-(ethenyloxy) butyl]ester carbamic acid, (4-methyl-1,3-phenylene)bis-, bis [4-(ethenyloxy)butyl]ester, 1,2,4-benzenetricarboxylic acid, tris(4-ethenyloxy)butyl]ester, polyester, aromatic polyester divinyl ether, polyfunctional ester, polyfunctional polyester, aromatic urethane divinyl ether, aliphatic urethane divinyl ether, urethane divinyl ether oligomer, and mixture thereof.

9. A coated optical article according to claim 8, wherein the vinyl monomer is an aliphatic urethane divinyl ether.

10. A coated optical article according to claim 3, wherein the copolymerizable monomer is an epoxidized monomer in the primer coating composition or oligomer and is present in an amount effective to improve the curing characteristics of the coating composition and/or adhesion characteristics of a coating formed therefrom, the epoxidized monomer that is selected from the group consisting of epoxidized soybean oil propylene oxide, hexanediol diglycidyl ether, epoxy butane, trimethylopropane, diglycidyl ether of propylene oxide modified (bisphenol A), dibromo neopentyl glycol, N,N-diglycidyl aniline, 3,4-epoxy-6-methycyclohexyl-methy-3, 4-epoxy-6-methylcyclohexane carboxylate, oxiranemethanamine, N-(2-methylphenyl)-N-(oxiranylmethyl)-N,N-diglicidyl-o-toluidyne, allyl glycidyl ether, glycidyl methacrylate, bis phenolfluorene diglycidyl ether, glycidyl ether of 4-hydroxyphenyl ether, diglycidyl ether of bisphenol F, and mixture thereof.

11. A coated optical article according to claim 3, wherein the primer coating composition further includes approximately 0.001 to 20% by weight, based on the total weight of the primer coating composition, excluding solvent, an adhesion promoting/modifying comonomer that is selected from group consisting of isocyanates, mercaptans, anhydrides, silanes, carboxylic acid, amines, ketones, alcohols, and mixtures thereof.

12. A coated optical article according to claim 11, wherein the adhesion promoting comonomer is a silane.

13. A coated optical article according to claim 3, wherein the primer coating composition further includes approximately 0.05 to 4% by weight, based on the total weight of the primer coating composition, excluding solvent, of a curing agent selected from the group consisting of azodiisobutyronitrile, azodiisobutyronitrile, 2,2'-azobis N,N'-dimethylenelsobutyramidine) dihydrochloride, 2,2'-azobis(2-amidinopropane)dihydrochloride, 2,2'-azobis(N,N'-dimethyleneisobutyramidine), 4,4'-azobis 4-cyanopentanoic acid), 2,2'-azobis{2-methyl-N-[1,1-bis(hydroxymethyl)-2-hydroxyethyl]ropion-amide}, 2,2'-azobis(2-methyl-N-[1,1-bis(hydroxymethyl)ethyl] propionamide}, 2,2'-azobis[2-methyl-N-(2-hydroxyethyl) propionamide], 2,2'-azobis(isobutyramide)dihydrate, 2,2'-azobis(4-methoxy-2,4-dimethylvaleronitrile), 2,2'-azobis 2,4-dimethylvaleronitrile), 2,2'-azobisisobutyronitrole, dimethyl 2,2'-azobis-isobutyrate, 2,2'-azobis(2-methyl-butyronitrile), 1,1'-azobis 1-cyclohexanecarbonitrile), (carbamoylazo)-isobutyronitrile, 2,2'-azobis(2,4,4-trimethylpentane), 2-phenylazo-2,4-dimethyl-4-methoxyvaleronitrile, 2,2'-azobis(2-methylpropane), 1,1-di-(-butyl peroxy-3,3,5-trimethyl cyclohexane), t-butyl per-2-ethylhexanoate, benzoyl peroxide, ethyl hexyl percarbonate, methyl ethyl ketone peroxide, triaryl sulfonium hexafluoroantimonate, 2,4,6-trimethylbenzoyldiphenyl phosphine oxide, bis(2,4,6-trimethylbenzoyl)-phenyl-phosphine oxide, 1-bis(2,6-dimethoxybenzoyl)-2,4,4-trimethylpentyl phosphineoxide, methyl penylglycoxylate, bis(t-butyl peroxide)diisopropylbenzene, t-butyl perbenzoate, t-butyl peroxy neodecanoate, aluminium acetyl acetonate, dibutyltin dilaurate, dibutyltin oxide, and mixtures therof.

14. A coated optical article according to claim 3, wherein the primer coating composition includes an effective amount of a solvent that is selected from the group consisting of water, alcohols, ketones, and mixtures thereof.

15. A coated optical article according to claim 3, wherein the primer coating composition further includes an additive that is selected from the group consisting of inhibitors, surfactants, UV absorbers, stabilizers, materials capable of modifying refractive index, and mixtures thereof.

16. A cross-linkable primer coating composition for coating on a surface of an optical article, which composition is UV curable and comprises:

approximately 15% to 80% by weight of a di- or polythiol compound that is selected from the group consisting of 4-mercaptomethyl-3,6-dithial,8-octanedithiol, trimethylolpropane tris(3-mercaptopropionate), pentaerythritol tetrakis, (3-mercapto-propionate), pentaerythritol tetrakis(3-mercaptoacetate) and mixtures thereof;

approximately 10 to 80% by weight or a di- or poly allyl or vinyl monomer including an allyl component that is selected from the group consisting of diallyl isophthalate, tetraallyl pyromellitate, triallyl trimesate, triallyl isocyanurate, triallyl cyanurate, tetraallyloxyethane triallylamine, diethylene glycol bis(allyl) carbonate and mixtures thereof; and 0 to approximately 20% by weight of a polymerizable comonomer that is selected from the group consisting of epoxidized monomer or oligomer; vinyls; allylics; polyoxyalkylene glycol; di-, tri-, tetra- and higher acrylates or methacrylates; polymerizable bisphenol monomers; urethane monomers having 2 to 6 terminal acrylic or methacrylic groups; fluorene acrylates or methacrylates; thioacrylate or thiomethacrylate monomers; acrylic or methacrylic monomers; and mixtures thereof.

17. A cross-linkable primer coating composition for coating a surface of an optical article, which composition is UV curable in the presence of a photochromic dye component; and comprises:

a di- or polythiol monomer;

an allyl or vinyl monomer;

a photochromic dye component; and optionally a polymerizable comonomer.

18. A primer coating composition according to claim 17, wherein the photochromic dye component is selected from the group consisting of anthraquinones, phthalocyanines, spiro-oxazines, chromenes, pyrans, fulgides and mixtures thereof.

19. A primer coating composition according to claim 18, wherein the photochromic dye is selected from the group consisting of 1,3-dihydrospiro[2H-anthra[2,3-d]imidazole-2,1'-cyclohexane]-5,10-dione, 1,3-dihydrospiro[2H-anthra[2,3-d]imidazole-2,1'-cyclohexahe]-6,11-dione, 1,3-dihydro-4-(phenylthio)spiro[2H-anthra'1,2-d]imidazole-2,1'cyclohexane]-6,11-dione, 1,3-dihydrospiro[2-H-anthra[1,2-d]imidazole-2,1'-cycloheptane]-6,11-dione, 1,3,3-trimethylspiroindole-2,3'-[3H]naphtho[2,1-b]-1,4-oxazine], 1,3,3-trimethyl-9'-hydroxyspiroindolinenaphthoxadine, 1,3,3-trimethyl-9'-(2-hydroxyethyloxy)-spiroindolinenaphthoxadine, 1,3,3-trimethyl-6'-piperidino-9'-hydroxy-spiroindolinenaphthoxadine, 2-methyl-3,3'-spirobi[3H-naphtho[2,1-b]pyran](2-Me), 2-phenyl-3-methyl-7-methoxy-8'-nitrospiro[4H-1-benzopyran-4,3'-[3H]-naphtho]2,1-b]pyran, spiro[2H-1-benzopyran-2,9'-xanthene], 8-methoxy-1',3'-dimethylspiro(2H-1-benzopyran-2,2'-(1'H)-quinoline, 2,2'-spirobi[2H-1-benzopyran], 5'-amino-1',3',3'-trimethylspiro[2H-1-benzopyran-2,2'-indoline, ethyl-β-methyl-β-(3',3'-dimethyl-6-nitrospiro(2H-1-benzopyran-2,2'-indolin1'-yl)-propenoate, (1,3-propanediyl)bis[3',3'-dimethyl-6-nitrospiro [2H-1-benzopyran-2,2'indoline], 3,3'-dimethyl-6-nitrospiro [2H-1-benzopyrao-2,2'-benzoxazoline], 6'-methylthio-3,3'-dimethyl-8-methoxy-6-nitrospiro[2H-1-benzopyran-2, 2'benzothiozoline], (1,2-ethanediyl)bis[8-methoxy-3-methyl-6-nitrospiro[2H-1-benzopyran-2,2'benzothiozoline], N-N'-bis(3,3'-dimethyl-6-nitrospiro[2H-1-benzopyran-2,2' (3'H)benzothioazol-6'-yl)decanediamide, -α-(2,5-dimethyl-3-furyl)ethylidene(Z)-ethylidenesuccinic anhydride; α-(2,5-dimethyl-3-furyl)-α',δ-dimethylfulgide, 2,5-diphenyl-4-(2'-chlorophenyl)imidazole, [(2',4'-dinitrophenyl)methyl]-1H-benzimidazole, N-N-diethyl-2-phenyl-2H-phenanthro[9,10-d]imidazol-2-amine, 2-nitro-3-aminofluoren2-amino-4-(2'-furanyl)-6H-1,3-thiazine-6-thione, and mixtures thereof.

20. A coated optical article according to claim 1, wherein the primer coating provides improved impact resistance to the optical article.

21. A coated optical article according to claim 1, wherein the primer coating provides improved adhesion between the optical article and a second coating, when present.

22. A coated optical article according to claim 1 wherein the optical article is an optical lens.

23. A coated optical lens according to claim 22 wherein the optical lens is formed from a plastics material.

24. A coated optical lens according to claim 23 wherein the optical lens is formed from a polycarbonate.

25. A coated optical article according to claim 1, wherein the primer coating has a thickness of approximately 0.1 to 5 micron.

26. A coated optical article comprising:

an optical article; and a primer coating on at least one surface of the optical article, the primer coating being receptive to the inclusion of dyes; the primer coating being formed by UV curing a cross-linkable primer coating composition comprising:

a di- or polythiol compound;

an allyl or vinyl monomer; and optionally a polymerizable comonomer.

27. A coated optical article according to claim 26, further including an effective amount of a dye component which is introduced into the primer coating or included in the primer coating composition.

28. A coated optical article according to claim 27, wherein the dye component is selected from the group consisting of anthraquinones, phthalocyanines, spirooxazines, chromenes, pyrans including spiro-pyrans, fulgides, and mixtures thereof.

29. A coated optical article according to claim 27, wherein the optical article has a front (convex) surface and a back (concave) surface the primer coating includes a dye component, and the primer coating is applied to at least the front surface of the optical article.

30. A coated optical article according to claim 27, wherein the primer coating has a thickness of from approximately 0.01 to 100 micron.

31. A coated optical article according to claim 30, wherein the primer coating includes a dye component and the coating has a thickness of approximately 10 to 75 micron.

32. A coated optical article according to claim 26, wherein one or both surface(s) of the optical article is (are) subjected to a surface treatment, prior to being coated.

33. A coated optical article according to claim 32, wherein the surface treatment is a UV radiation, corona discharge, or caustic treatment.

34. A multi-coated optical article including
an optical article;
a primer coating on at least one surface of the optical article, the primer coating formed from across-link primer coating composition comprising:
a di- or polythiol compound;
an allyl or vinyl monomer; and
optionally a polymerizable comonomer; and
a secondary coating which provides a desirable optical and/or mechanical property to the optical article, which coating at least in part overlays the primer coating.

35. A multi-coated optical article according to claim 34, wherein the secondary coating includes an anti-reflective coating and/or an abrasion resistance coating.

36. A multi-coated optical article including:
an optical article;
a primer coating on at least one surface of the optical article, the primer coating formed from a primer coating composition that comprises:
a di- or polythiol compound;
an allyl or vinyl monomer; and
optionally a polymerizable comonomer; and
a secondary anti-reflective and/or abrasion resistance coating, which coating at least in part overlays the primer coating and wherein the primer coating provides improved impact resistance to the optical article.

37. A multi-coated optical article according to claim 36, wherein the optical article is a lens.

38. A multi-coated optical article according to claim 37, wherein the lens is formed from a polycarbonate.

39. A method for preparing a coated optical article which method includes
(a) providing a mould that is used to manufacture the optical article;
a cross-linkable primer coating composition comprising:
a di- or polythiol compound;
an allyl or vinyl monomer; and
optionally a polymerizable comonomer; and
a cross-linkable polymeric casting composition;
(b) applying a layer of the primer coating composition to at least a first face of the mould used to manufacture the optical article, wherein the first face is capable of imparting a desired optical configuration on a first optical surface of the optical article;
(c) reacting the primer coating composition to a degree that it forms a dry film that is at least weakly adhered to the first face and that substantially replicates the first face in an aberration-free manner;
(d) filling the mould with the cross-linkable polymeric casting composition; and
(e) hardening the casting composition so as to form the optical article and adhere the dry primer coating to the first optical surface.

40. A method according to claim 39, wherein the primer coating composition comprises:
approximately 15 to 80% by weight, based on the total weight of the primer coating composition excluding solvent of a di- or polythiol compound having a functionality of from 2 to 4;
approximately 10 to 80% by weight or a di- or poly allyl or vinyl monomer; and
0 to approximately 20% by weight of a polymerizable comonomer that is selected from the group consisting of epoxidized monomer or oligomer; vinyls; allylics; polyoxyalkylene glycol; di-, tri-, tetra- and higher acrylates or methacrylates; polymerizable bisphenol monomers; urethane monomers having 2 to 6 terminal acrylic or methacrylic groups; fluorene acrylates or methacrylates; thioacrylate or thiomethacrylate monomers; acrylic or methacrylic monomers; and mixtures thereof.

41. A method according to claim 39, wherein the primer coating composition includes a photochromic dye that is selected from the group consisting of anthraquinones, phthalocyanines, spiro-oxazines, chromenes, pyrans, fulgides, and mixtures thereof.

42. A method according to claim 39, wherein the step of hardening the casting composition comprises (i) introducing a UV curing agent and optionally a heat curing agent into the casting composition, and (ii) curing the casting composition and coating composition with UV.

43. A method according to claim 42, wherein the curing agent is present in an amount of from approximately 0.05 to 4% by weight, and is selected from the group consisting of azodiisobuty-ronitrile, azodiisobutyronitrile, 2,2'-azobisN,N'-dimethylenelsobutyramidine)dihydrochloride, 2,2'-azobis(2-amidinopropane) dihydrochloride, 2,2'-azobis(N,N'-dimethyleneisobutyramidine), 4,4'-azobis4-cyanopentanoic acid), 2,2'-azobis{2-methyl-N-[1,1-bis(hydroxymethyl)-2-hydroxyethyl]ropion-amide}, 2,2'-azobis(2-methyl-N-[1,1-bis(hydroxymethyl)ethyl]propionamide}, 2,2'-azobis[2-methyl-N-(2-hydroxyethyl)propionamide], 2,2'-azobis(isobutyramide)dihydrate, 2,2'-azobis(4-methoxy-2,4-dimethylvaleronitrile), 2,2'-azobis2,4-dimethylvaleronitrile), 2,2'-azobisisobutyronitrole, dimethyl 2,2'-azobis-isobutyrate, 2,2'-azobis(2-methyl-butyronitrile), 1,1'-azobis 1-cyclohexanecarbonitrile), (carbamoylazo)-isobutyronitrile, 2,2'-azobis(2,4,4-trimethylpentane), 2-phenylazo-2,4-dimethyl-4-methoxyvaleronitrile, 2,2'-azobis(2-methylpropane), 1,1-di-(-butyl peroxy-3,3,5-trimethyl cyclohexane), t-butyl per-2-ethylhexanoate, benzoyl peroxide, ethyl hexyl percarbonate, methyl ethyl ketone peroxide, triaryl sulfonium hexafluoroantimonate, 2,4,6-trimethylbenzoyldiphenyl phosphine oxide), bis(2,4,6-trimethylbenzoyl)-phenyl-phosphine oxide, 1-bis(2,6-dimethoxybenzoyl)-2,4,4-trimethylpentyl phosphineoxide, methyl penylglycoxylate, bis(t-butyl peroxide)diisopropylbenzene, t-butyl perbenzoate, t-butyl peroxy neodecanoate, aluminium acetyl acetonate, dibutyltin dilaurate, dibutyltin oxide, and mixtures therof.

44. A method according to claim 39, further including subjecting the coated optical article to an imbibition step to introduce a dye into the primer coating layer.

45. A method according to claim 44, wherein the dye is a photochromic dye that is selected from the group consisting of anthraquinones, phthalocyanines, spiro oxazines, chromenes, pyrans, fulgides and mixtures thereof.

46. A coated optical article that is prepared by the method according to claim 41.

* * * * *